(12) United States Patent
Norrie

(10) Patent No.: US 8,886,872 B1
(45) Date of Patent: Nov. 11, 2014

(54) MEMORY COMMAND DISPATCH IN A DATA STORAGE DEVICE

(75) Inventor: Thomas J. Norrie, Mountain View, CA (US)

(73) Assignee: Google Inc., Mountain View, CA (US)

(*) Notice: Subject to any disclaimer, the term of this patent is extended or adjusted under 35 U.S.C. 154(b) by 321 days.

(21) Appl. No.: 13/403,558

(22) Filed: Feb. 23, 2012

Related U.S. Application Data

(63) Continuation-in-part of application No. 13/267,613, filed on Oct. 6, 2011, now Pat. No. 8,255,618.

(51) Int. Cl.
*G06F 3/00* (2006.01)
*G06F 17/30* (2006.01)
*G06F 13/00* (2006.01)

(52) U.S. Cl.
CPC .......... *G06F 17/30327* (2013.01); *G06F 13/00* (2013.01); *G06F 3/00* (2013.01)
USPC ...................... 711/103; 711/E12.002; 710/38

(58) Field of Classification Search
CPC ...... G06F 3/00; G06F 13/00; G06F 17/30327
USPC ........................... 711/103, 152, 158, E12.001
See application file for complete search history.

(56) References Cited

U.S. PATENT DOCUMENTS

| | | | |
|---|---|---|---|
| 6,301,639 B1 | 10/2001 | Cleavinger et al. | |
| 6,345,324 B1 | 2/2002 | Baskey et al. | |
| 7,778,997 B1* | 8/2010 | Chapman et al. | 707/713 |
| 8,055,816 B2 | 11/2011 | Asnaashari et al. | |
| 8,276,160 B2* | 9/2012 | Blue et al. | 719/314 |
| 2010/0235335 A1* | 9/2010 | Heman et al. | 711/103 |

OTHER PUBLICATIONS

Non-Final Office Action for U.S. Appl. No. 13/267,613, mailed Dec. 8, 2011, 9 pages.

* cited by examiner

*Primary Examiner* — Pierre-Michel Bataille
(74) *Attorney, Agent, or Firm* — Brake Hughes Bellermann LLP

(57) ABSTRACT

Methods and apparatus for dispatching memory operations are disclosed. An example memory controller for controlling operation of a data storage device includes a command dispatcher that dispatches memory operation commands for execution by a plurality of memory devices. The command dispatcher includes a command buffer that separately and respectively queues the memory operation commands by maintaining a respective linked list of memory operation commands for each memory device. The command dispatcher also includes a selection circuit with a plurality of leaf nodes. Each leaf node corresponds with one of the linked lists and indicates whether its corresponding linked list includes memory operation commands awaiting dispatch. The selection circuit also includes an OR-reduction tree that reduces the plurality of leaf node indications to a root node indication. The selection circuit iterates over the nodes of the OR-reduction tree to select memory operation commands for dispatch by the command dispatcher.

23 Claims, 11 Drawing Sheets

EXAMPLE
COMMAND SLOT ALLOCATIONS
(1000 TOTAL SLOTS)

| PARTITION_A ALLOCATION | PARTITION_B ALLOCATION | PARTITION_C ALLOCATION | PARTITION_A GUARANTEE | PARTITION_B GUARANTEE | PARTITION_C GUARANTEE | SHARED |
|---|---|---|---|---|---|---|
| 50% | 25% | 25% | 500 | 250 | 250 | 0 |
| 600 | 300 | 100 | 600 | 300 | 100 | 0 |
| 700 | 300 | 300 | 500 | 100 | 100 | 300 |

FIG. 4

MEMORY COMMAND DISPATCH IN A DATA STORAGE DEVICE

CROSS REFERENCE TO RELATED APPLICATIONS

This application is a continuation in-part application under 35 U.S.C. §120 of U.S. patent application Ser. No. 13/267,613, entitled "Performance Isolation in a Shared Memory Device" and filed on Oct. 6, 2011, now U.S. Pat. No. 8,255,618, the disclosure of which is incorporated herein by reference in its entirety.

TECHNICAL FIELD

This document relates, generally, to dispatching memory operation commands for execution.

SUMMARY

In a general aspect, a memory controller for controlling operation of a data storage device includes a command dispatcher that is configured to dispatch memory operation commands for execution by a plurality of memory devices of the data storage device The command dispatcher includes a command buffer that is configured to separately and respectively queue the memory operation commands by maintaining, for each of the plurality of memory devices, a respective linked list of corresponding memory operation commands. The command dispatcher also includes a selection circuit that is operationally coupled with the command buffer. The selection circuit includes a plurality of leaf nodes, where each leaf node corresponds with one of the linked lists and is configured to indicate whether its corresponding linked list includes one or more memory operation commands awaiting dispatch. The selection circuit also includes an OR-reduction tree that is configured to reduce the plurality of leaf node indications to a root node indication. The root node indication indicates whether the command buffer has any memory operation commands stored therein that are awaiting dispatch. The selection circuit is configured to iterate over the nodes of the OR-reduction tree to select memory operation commands for dispatch by the command dispatcher.

Implementations may include one or more of the following features. For instance, the memory controller may include a plurality of command queues that are operationally coupled with the command dispatcher. Each command queue may be associated with a respective one of the plurality of memory devices and configured to receive dispatched memory operation commands corresponding with its respective memory device from the command dispatcher in a same order as received by the command dispatcher. Each of the leaf nodes may be configured to indicate whether its corresponding command queue has available queue space. Each of the plurality of command queues may be configured to provide an indication to the command dispatcher when it has space to receive a next memory operation command from the command dispatcher. The command dispatcher may be configured to dispatch memory operation commands to the plurality of command queues based on the iteration of the OR-reduction tree and the respective indications from the command queues.

The OR-reduction tree may be arranged in accordance with a set of memory channel indices that respectively correspond a with memory channels of the data storage device and, for each channel index, a set of chip indices that respectively correspond with memory devices included in the corresponding memory channel. The combination of a given memory channel index and a given chip index may indicate a specific memory device of the plurality of memory devices. Iterating the OR-reduction tree may include iterating the OR-reduction tree by the chip indices then by the channel indices. Iterating the OR-reduction tree may include iterating the OR-reduction tree by the channel indices then by the chip indices. The OR-reduction tree may be arranged to facilitate mapping of respective sequential integer indices for the plurality of memory devices to a respective binary memory channel index and a respective binary chip index for each of the plurality of memory devices.

Indicating that a given linked list includes one or more memory operation commands awaiting dispatch may include indicating that the given linked list has a non-null head pointer.

Iterating the OR-reduction tree may include traversing branches of the OR-reduction tree that indicate memory operation commands awaiting dispatch and ignoring branches of the OR-reduction tree that do not indicate memory operation commands awaiting dispatch. The OR-reduction tree may include a plurality of stages, where each stage includes one or more sets of branches. Each branch may be configured to communicate a corresponding indication of whether any leaf nodes in that branch indicate memory operation commands awaiting dispatch. Each set of branches may be OR-reduced to a respective single node of the OR-reduction tree. The selection circuit may include, for each set of branches in the OR-reduction tree, a priority encoder configured to generate an output value based on the corresponding indications received from its respective set of branches. The command dispatcher may be configured to dispatch memory operation commands based on the output values of the priority encoders.

In another general aspect, a memory controller for controlling operation of a data storage device includes a command dispatcher that is configured to dispatch memory operation commands for execution by a plurality of memory devices of the data storage device. The command dispatcher includes a command buffer that is configured to separately and respectively queue the memory operation commands by maintaining, for each of the plurality of memory devices, a respective linked list of corresponding memory operation commands. The command dispatcher also includes a selection circuit that is operationally coupled with the command buffer. The selection circuit includes a plurality of leaf nodes, where each leaf node corresponds with one of the linked lists and is configured to indicate whether its corresponding linked list includes one or more memory operation commands awaiting dispatch. The selection circuit also includes an OR-reduction tree that is configured to reduce the plurality of leaf node indications to a root node indication. The root node indication indicates whether the command buffer has any memory operation commands stored therein that are awaiting dispatch. The OR-reduction tree includes a plurality of stages. Each stage includes one or more sets of branches, where each branch is configured to communicate a corresponding indication of whether any leaf nodes in that branch indicate that corresponding memory operation commands are awaiting dispatch. Each set of branches is OR-reduced to a respective single node of the OR-reduction tree. The selection circuit also includes, for each set of branches in the OR-reduction tree, a priority encoder that is configured to generate an output value based on the corresponding indications received from its respective set of branches. The selection circuit is configured to iterate over the nodes of the OR-reduction tree to select memory operation commands for dispatch by the command dispatcher. The command dispatcher is further configured to dispatch memory operation commands based on the output values of the priority encoders. The memory controller also includes a plurality of command queues that are operationally coupled with the command dispatcher. Each command queue is associated with a respective one of the plurality of memory devices and is configured to receive dispatched memory operation commands corresponding with its respective memory device from the command dispatcher in a same order as received by the command dispatcher.

Implementations may include one or more of the following features. For example, each of the leaf nodes may be configured to indicate whether its corresponding command queue has available queue space. The OR-reduction tree may be arranged in accordance with a set of memory channel indices that respectively correspond with memory channels of the data storage device and, for each channel index, a set of chip indices that respectively correspond with memory devices included in the corresponding memory channel. The combination of a given memory channel index and a given chip index may indicate a specific memory device of the plurality of memory devices. The OR-reduction tree may be arranged to facilitate mapping respective sequential integer indices for the plurality of memory devices to a respective binary memory channel index and a respective binary chip index for each of the plurality of memory devices.

Each of the plurality of command queues may be configured to provide an indication to the command dispatcher when it has space to receive a next memory operation command from the command dispatcher. The command dispatcher may be configured to dispatch memory operation commands to the plurality of command queues based on the iteration of the OR-reduction tree and the respective indications from the command queues.

In another general aspect, a command dispatcher for dispatching memory operation commands for execution in a data storage device includes a command buffer that is configured to separately and respectively queue the memory operation commands by maintaining, for each of the plurality of memory devices, a respective linked list of corresponding memory operation commands. The command dispatcher also includes a selection circuit that is operationally coupled with the command buffer. The selection circuit includes a plurality of leaf nodes, where each leaf node corresponds with one of the linked lists and is configured to indicate whether its corresponding linked list includes one or more memory operation commands awaiting dispatch. The selection circuit also includes an OR-reduction tree that is configured to reduce the plurality of leaf node indications to a root node indication, where the root node indication indicates whether the command buffer has any memory operation commands stored therein that are awaiting dispatch. The OR-reduction tree includes a plurality of stages, where each stage includes one or more sets of branches. Each branch is configured to communicate a corresponding indication of whether any leaf nodes in that branch indicate memory operation commands awaiting dispatch. Each set of branches is OR-reduced to a respective single node of the OR-reduction tree. The indications of each set of branches are encoded to generate a respective output value based on the corresponding indications received from its respective set of branches. The selection circuit is configured to iterate over the nodes of the OR-reduction tree to select memory operation commands for dispatch by the command dispatcher. The command dispatcher is configured to dispatch memory operation commands based on the respective output values and iteration of the OR-reduction tree.

Implementations may include one or more of the following features. For example, each of the leaf nodes may be configured to indicate whether its corresponding command queue has available queue space. Encoding the indications of each set of branches may include encoding the indications of each set of branches using a priority encoder.

The OR-reduction tree may be arranged in accordance with a set of memory channel indices that respectively correspond with memory channels of the data storage device and, for each channel index, a set of chip indices that respectively correspond with memory devices included in the corresponding memory channel. The combination of a given memory channel index and a given chip index may indicate a specific memory device of the plurality of memory devices.

Iterating the OR-reduction tree may include iterating the OR-reduction tree by the chip indices then by the channel indices. Iterating the OR-reduction tree may include iterating the OR-reduction tree by the channel indices then by the chip indices. The OR-reduction tree may be arranged to facilitate mapping respective sequential integer indices for the plurality of memory devices to a respective binary memory channel index and a respective binary chip index for each of the plurality of memory devices.

BRIEF DESCRIPTION OF THE DRAWINGS

FIG. 4 is a table illustrating command buffer slot allocations in accordance with example implementations.

DETAILED DESCRIPTION

Figure 1:
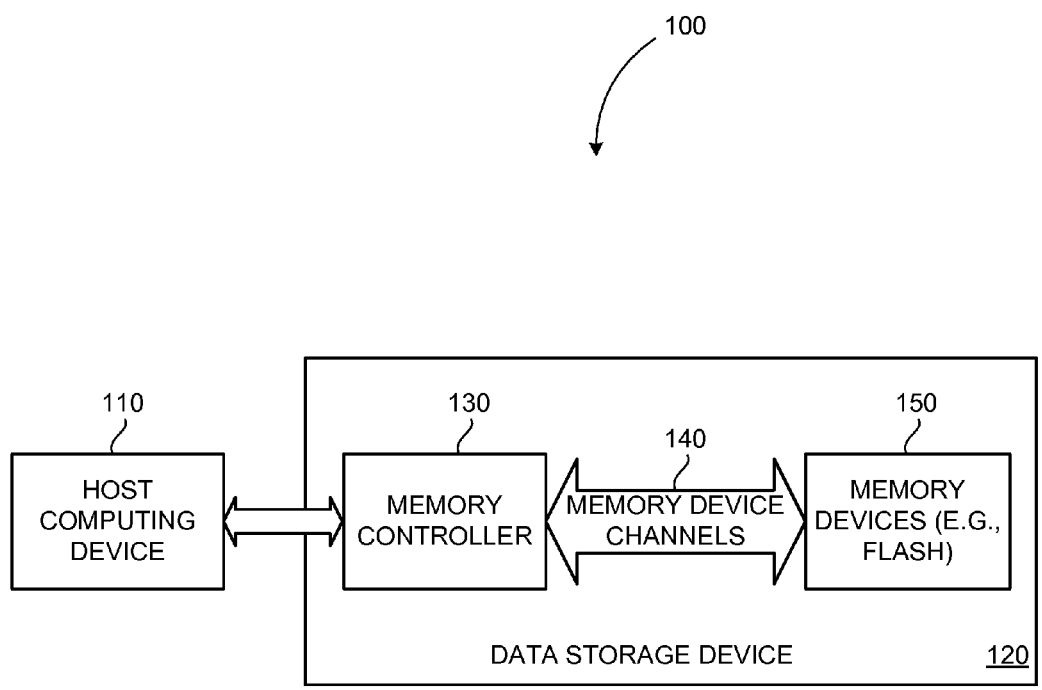
FIG. 1 is a block diagram illustrating a computing system in accordance with an example implementation.

FIG. 1 is a block diagram illustrating a computing system 100 in accordance with an example implementation. The computing system 100 includes a host computing device 110 and a data storage device 120. The host computing device 110 and the data storage device 120 may be implemented using the techniques described herein. The host 110, in this example may be an electronic device that is operably coupled with the data storage device 120, and may issue various types of commands and/or requests to the data storage device. The host 110 may take a number of forms. As some examples, the host 110 may be implemented as a personal computer, a laptop computer, a server, a tablet computer or a netbook computer. In other implementations, the host 110 may take other forms as well. The data storage device 120 may also take a number of forms. The data storage device 120 may be implemented as a number of appropriate devices that may work in conjunction with a host device (e.g., the host device 110) to store and/or retrieve electronic data. For instance, the data storage device may be solid state drive (SSD) (e.g., a flash memory based SSD), a magnetic disk drive or an optical disk drive, as some examples.

As shown in FIG. 1, the data storage device 120 includes a memory controller 130, memory device channel interfaces 140 and memory devices 150. The memory devices 150 may be implemented using a number of different types of memory devices. For instance, the memory devices 150 may be implemented using flash memory devices, or other types of non-volatile memory devices. In certain implementations, volatile memory devices, such as random access memory devices, may be used. For purposes of this disclosure, the various implementations described herein will be principally discussed as being implemented using flash memory devices. It will be appreciated, however, that other approaches are possible and other types of memory devices may be used to implement the implementations described herein.

In the computing system 100, as well as in other implementations described herein, the memory controller 130 may obtain memory operation commands from the host computing device 110. When implementing the data storage device 120 using flash memory devices for the memory devices 150, the memory operation commands obtained by the memory controller 130 from the host computing device 110 may include flash memory read commands, flash memory write commands and flash memory erase commands, as well as other types of flash memory commands (e.g., move commands and/or copy commands). For purposes of this disclosure, the terms memory operation command, memory operation and memory command may be used interchangeably to describe machine-readable instructions (e.g., from a host computing device to a data storage device) to execute one or more data storage functions in a data storage device.

In the computing system 100, the memory devices 150 may include a plurality of memory devices, such as flash memory devices, that are organized into a plurality of memory channels. In such an approach, each of the memory channels may include one or more individual memory devices. Depending on the particular implementation, the individual memory devices of a given memory channel may be implemented in individual device packages, or alternatively, multiple memory devices of a given memory channel may be included in a single device package.

For instance, in an example implementation, the data storage device 120 may include multiple memory channels, where each memory channel includes twenty flash memory devices 150 that are implemented in five separate device packages (e.g., four flash memory devices per package). In such an approach, the memory controller 130 may communicate with the memory devices 150 of each memory channel using a separate memory device channel interface 140. Each memory device channel interface 140 may include a respective channel controller that is configured to facilitate communication between the memory devices 150 of the respective memory channel and the memory controller 130. For example, such channel controllers may be configured to manage a shared bus between the memory controller 130 and the memory devices 150 of a given memory channel, including communicating memory operation commands, chip select information, as well as managing communication of other data and control information between the memory controller 130 and the memory devices 150 over a corresponding memory device channel interface 140.

Figure 2:
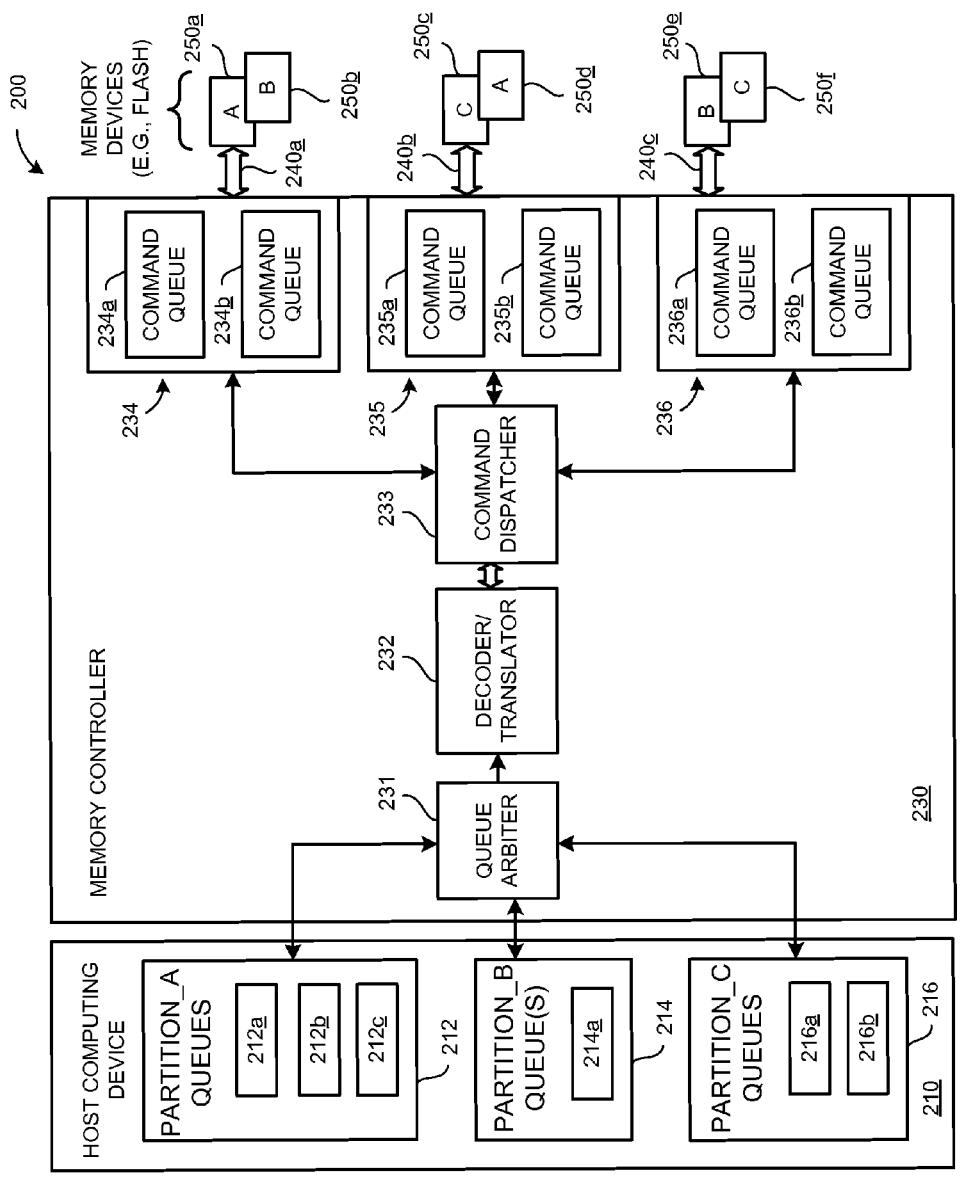
FIG. 2 is a block diagram illustrating another computing system in accordance with an example implementation.

FIG. 2 is a block diagram illustrating a computing system 200 in accordance with another example implementation. The computing system 200 shown in FIG. 2 includes similar elements to the computing system 100 shown in FIG. 1. Like elements of the computing system 200 to those of the computing system 100 are referenced with 200 series reference numerals that correspond with the 100 series reference numerals shown in FIG. 1. For instance, the computing system 200 includes a host computing device 210, a memory controller 230, memory device communication channels 240 (240a-240c) and memory devices 250 (250a-250f).

The various elements of the computing system 200 shown in FIG. 2 (as well as the other implementations described herein) are provided by way of illustration. The computing system 200 (and the other implementations described herein) may include other elements or aspects. For instance, the computing system 200, may include data path elements configured to communicate data between the host device 210 and the memory controller 230 and/or the memory devices 250a-250f. Such data path components may include, for example, one or more bus interfaces and/or a direct memory access (DMA) controller, as well as a number of other possible components. Further, the computing system 200 may also include additional control path elements other than those shown in FIG. 2. It will be appreciated that the particular components and/or aspects of the computing system 200, as well as the other implementations described herein, will depend, at least in part, on the particular implementation.

In the computing system 200, the host computing device 210, the memory controller 230, the memory device channels 240 and the memory devices 250 may be configured to implement a plurality of memory partitions. In the implementation shown in FIG. 2, three memory partitions are implemented, PARTITION_A, PARTITION_B and PARTITION_C. In other implementations, additional or fewer partitions may be implemented.

As shown in FIG. 2 the host computing device 210 includes one or more queues (which may be referred to as host memory operation queues or partition queues) that are associated with each memory partition implemented in the computing system 200. For example, the host computing device 210 includes PARTITION_A Queues 212, PARTITION_B Queues 214 and PARTITION_C Queues 216. In the host computing device 210, the PARTITION_A Queues 212 includes a queue 212a, a queue 212b and a queue 212c; the PARTITION_B Queues 214 includes only a single queue 214a; and the PARTITION_C Queues 216 includes a queue 216a and a queue 216b. In other implementations, additional or fewer queues may be used for each memory partition. In the computing system 200, the memory partition queues 212-216 may be used to queue memory operation commands generated by the host computing device 210 that are waiting to be communicated to the memory controller 230 for execution by the memory devices 250.

In the computing system 200, the host computing device 210 may be configured to assign priorities to the individual host memory operation queues for memory partitions that have more than one queue associated with them. For instance, for the PARTITION_A Queues 212, the queue 212a may be a high priority queue, the queue 212b may be a medium priority queue and the queue 212c may be a low priority queue. In order to implement such priorities, the host computing device 210 may assign weights to the individual queues. The PARTITION_A Queues 212 may then be sampled (by the memory controller 230 to obtain memory operations) in accordance with a work schedule that is based on the respective weights assigned to each queue. For example, if the queue 212*a* is assigned a weight of "6", the queue 212*b* is assigned a weight of '3' and the queue 212*c* is assigned a weight of '1', the corresponding work schedule would result in memory commands for PARTITION_A being obtained (by the memory controller 230) from the queue 212*a* twice as frequently as from the queue 212*b* and six times as frequently as from the queue 212*c*. Similarly, memory commands would be obtained (by the memory controller 230) from the queue 212*b* three times as frequently as from the queue 212*c*.

In addition to the relative priorities between individual host memory operation queues that are associated with a given memory partition, the memory controller 230 may sample the separate partition queue groups 212-216 based on a memory partition work-schedule, where the memory partition work schedule is based on relative priorities of the memory partitions with respect to one another. For example, the relative priorities between partitions may be determined based on command buffer slot allocations for each partition in the memory controller 230. Such an approach is discussed in further detail below with respect to FIGS. 3 and 4. Briefly, in such an approach, the groups of partition queues may be sampled based on a first set of relative priorities between the memory partitions (e.g., based on a memory partition work schedule), while the individual queues within a given group of partition queues may be sampled based on a second set of relative priorities between the individual queues (e.g., based on a partition queue work schedule). It will be appreciated that the memory partition work schedule and the queue partition work schedule may be implemented using a number of appropriate techniques, such as round robin, weighted round robin or other work scheduling techniques. Using such an approach, performance for each memory partition may be isolated from the other partitions, where guaranteed resources (e.g., memory command slots) may be allocated to each memory partition.

As shown in FIG. 2, the memory controller 230 of the computing system 200 includes a queue arbiter 231, a decoder/translator 232, a command dispatcher 233, command queue groups 234, 235 and 236, memory device channel interfaces 240*a*-240*c* and flash memory devices 250*a*-250*f*. As shown in FIG. 2, each memory device 250*a*-250*f* is associated with one of the three memory partitions of the computing system 200 (A, B or C, as indicated in FIG. 2). The particular arrangement shown in FIG. 2 is given by way of example and other arrangements are possible. For instance, the distribution of the memory devices across the memory partitions may be weighted. For example, four of the memory devices 250*a*-250*f* could be assigned to PARTITION_A, while only a single one of the memory devices 250*a*-250*f* may be respectively assigned to each of PARTITION_B and PARTITION_C. Of course, the computing system 200 may include additional or fewer memory devices and may also implement additional or fewer memory partitions, where the memory partitions may then be implemented in a number of different arrangements, such as using the techniques described herein.

As indicated above, in the computing system 200, the queue arbiter 231 of the memory controller 220 may be configured to obtain, from the host device 210, memory operation commands for execution by the memory devices in a number of fashions. For example, in one implementation, the queue arbiter 231 may be configured to obtain the memory operation commands from the host device in accordance with a partition work schedule for a plurality of memory partitions implemented in the data storage device, such as using the techniques described herein. In one implementation, such a partition work schedule may be based on availability of allocated memory operation command slots for each respective memory partition. Such an approach is discussed in further detail below with respect to FIGS. 3 and 4.

In the computing system 200, the queue arbiter 231 may be further configured, for a given memory partition, to obtain memory operation commands for the given memory partition (e.g., A, B or C) from one or more partition queues on the host device 210 that correspond with the given memory partition (respectively 212, 214 and 216) in accordance with such a partition work schedule. Further, the queue arbiter 231 may be still further configured to obtain memory operation commands for memory partitions having a plurality of corresponding partition queues in the host device 230 in accordance with respective priorities for each queue of the respective plurality of partition queues (e.g., in accordance with a partition queue work schedule).

In the computing system 200, the decoder/translator 232 may be configured to respectively determine which of the plurality of memory devices 250 corresponds with each of the memory operation commands. For instance, the decoder/translator 232 may be configured to perform logical to physical address translation on a respective memory address included in each of the memory operation commands that are obtained from the host computing device 210. Once the physical memory address is determined, the corresponding memory device 250 can be determined from the physical address. In other implementations, address translation may be performed by the host device 210. In such an approach, the decoder/translator 232 could be eliminated, and the queue arbiter 231 may be directly coupled with the command dispatcher 233. In other implementation, the decoder/translator 232 may perform additional functions, such as decoding received memory commands into respective sub-commands. It will be appreciated that the memory partition associated with each memory command is known when the command is obtained from the host computing device 210, as the host memory operation queues 212-214 are organized by partition.

The command dispatcher 233 of the computing system 200 may be operationally coupled with the queue arbiter 231 (e.g., via the decoder/translator 232 or directly), where the command dispatcher 233 is configured to receive the memory operation commands from the queue arbiter 231 (or sets of sub-commands for those memory operations commands) in a same order as obtained by the queue arbiter 231 from the host device 210. The command dispatcher 233 may be further configured to separately and respectively queue the memory operation commands for each of a plurality of memory devices 250. An example approach for queuing memory operation commands that may be implemented in the command dispatcher 233 is described in further detail below with respect to FIG. 3.

In the computing system 200, the command dispatcher 233 may be further configured to dispatch the memory commands to their respective command queues 234-236, such as based on a physical memory address determined by the decoder/translator 232. In the computing system 200, the command dispatcher 233 may be configured to dispatch respective memory operations for a given memory device 250 based on availability of queue slots in a respective command queue of the command queues 234-236.

The memory controller 230 of the computing system 200 shown in FIG. 2 includes groups of command queues 234, 235 and 236 (or memory device command queues) that are operationally coupled with the command dispatcher 233. In the computing system 200, each command queue group 234, 235 and 236 corresponds with a respective memory channel, such as described herein. Further, each command queue group 234, 235 and 236 includes individual command queues that each respectively correspond with a memory device of their respective memory channel. As an example, the command queue group 234 (which includes a command queue 234a and a command queue 234b) is operationally coupled with the memory device channel interface 240a. The memory device channel interface 240a is, in turn, operationally coupled with the memory devices 250a and 250b. The command queues 234a and 234b are associated, respectively, with the memory devices 250a and 250b. In such an arrangement, the memory device 250a would receive memory operation commands from the command queue 234a, while the memory device 250b would receive memory operation commands from the command queue 234b. The command queue groups 235 and 236 (and their command queues 235a, 235b, 236a and 236b) correspond with memory device channel interfaces 240b and 240c, and memory devices 250c, 250d, 250e and 250f in similar fashion as discussed above for the command queue group 234, the memory device channel interface 240a, and the memory devices 250a and 250b.

In the computing system 200, each of the command queues 234a-236b may be configured to receive the dispatched memory operation commands corresponding with its respective memory device 250a-250f from the command dispatcher 233 in a same order as received by the command dispatcher 233 from the queue arbiter. The commands queues 234a-236b may each be further configured to provide the received memory operation commands to their respective memory devices 250a-250f in a first-in-first-out order. Also, in the computing system 200, in implementations where each of the memory devices 250a-250f is associated with a respective memory partition, the command queues 234a-236b would likewise be associated with the same memory partition as their corresponding memory device.

Figure 3:
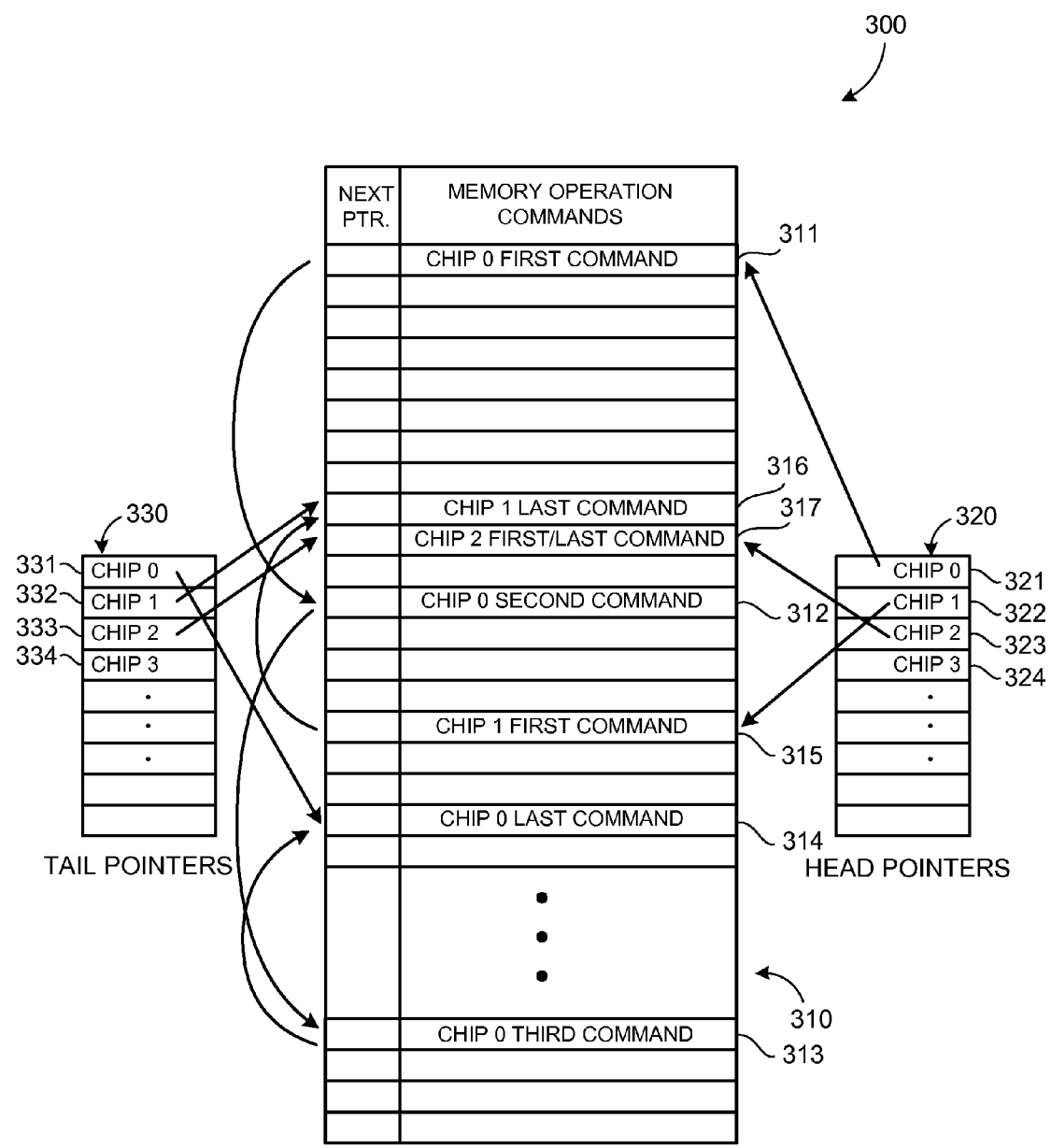
FIG. 3 is a block diagram illustrating a command dispatch buffer in accordance with an example implementation.

FIG. 3 is a block diagram illustrating a command dispatch buffer 300 in accordance with an example implementation. The command dispatch buffer 300 may be included, for example, in the command dispatcher 233 illustrated in FIG. 2 and discussed above. Accordingly, for purposes of illustration, the command dispatch buffer 300 will be described with further reference to FIG. 2. It will be appreciated, however, that the command dispatcher 233 may dispatch memory commands for execution using a number of other appropriate techniques.

The command dispatch buffer 300 may be used, in the computing system 200, to separately and respectively queue memory operation commands (e.g., received from the queue arbiter 231) for each of the memory devices 250a-250f. As shown in FIG. 3, the command dispatch buffer 300 includes a unified command buffer 310, an index of head pointers 320 and an index of tail pointers 330. Using the index of head pointers 320, the index of tail pointers 330 and next command pointer fields that are included in each command slot of the unified command buffer 310, the command dispatch buffer 300 may keep track of (e.g., separately and respectively queue) the memory operation commands for each of the memory devices 250a-250f using respective linked lists. In such an approach, the unified command buffer 310 may be configured to store memory operation commands for all of the memory devices 250a-250f, where the command buffer 300 keeps track of respective memory commands for each of the memory devices 250a-250f using the respective linked lists.

In an example implementation, where the command buffer 300 is implemented in the command dispatcher 233 of the memory controller 230, a memory partition work schedule may be determined based on respective allocations of the plurality of memory operation command slots to each of the plurality of memory partitions. Examples of such allocations are illustrated in FIG. 4. In such an approach, each time the queue arbiter 231 (in accordance with the partition work schedule) obtains a memory operation command for a given memory partition from the host computing device 210, the command buffer 300 may reduce a count of available commands slots for the given memory partition in the unified buffer 310 by one. When a memory command for the given memory partition is completed, the command buffer 300 may increase the count of available command slots in the unified buffer 210 for the given partition by one. If all the command slots in the unified buffer 310 that are allocated to the given memory partition (including any shared command slots) become occupied (are holding pending commands), the queue arbiter 231 may be configured to stop obtaining memory operation commands from the host computing device 210 for the given memory partition until at least one of the occupied command slots becomes available.

As indicated above, the command dispatch buffer 300 shown in FIG. 3 may be used to separately and respectively queue memory operation commands for each of a plurality of memory devices, such as the memory devices 250a-250f in a unified command buffer 310. By way of example, the implementation shown in FIG. 3 illustrates the use of linked lists for separately and respectively queuing memory operation commands for four memory devices, designated 'Chip 0', Chip '1', 'Chip 2' and 'Chip 3'. It will be appreciated that the approach illustrated in FIG. 3 may be used to keep track of memory operation commands for the memory devices 250a-250f in like fashion.

In the command dispatch buffer 300, the linked list of memory operation commands for Chip 0 includes four commands. The head pointer 321 for Chip 0 points to the first memory command available for dispatch to a corresponding command queue for Chip 0, which is stored in memory operation command slot (command slot) 311. In like fashion as discussed above, the command slot 311 includes a next pointer, which, as shown in FIG. 3, points to command slot 312, which includes the second command available in the command buffer 300 for dispatch to the command queue for Chip 0. The next pointer of the command slot 312 points to command slot 313, which includes the third command available in the command buffer 300 for dispatch to the command queue for Chip 0. The next pointer of the command slot 313 points to command slot 314, which includes the fourth, and last, command available in the command dispatch buffer 300 for dispatch to a command queue for Chip 0. As shown in FIG. 3, the tail pointer 331 for Chip 0 also points to the command slot 314, as command slot 314 is, in this illustration, the tail of a linked list for memory commands awaiting dispatch to Chip 0. The next pointer of the command slot 314 may be set to a null value, so as to indicate that there is not currently a next command (after the command in slot 314) for the linked list of memory commands for Chip 0.

In such an approach, when a memory command for a given memory device (e.g., Chip 0) is dispatched from, or received at the unified command buffer 310, the command dispatch buffer 300 may be configured to update the corresponding head pointer, tail pointer and next pointer(s) for the linked list corresponding with the given memory device, as appropriate. As an example, if a new memory command for Chip 0 is received by the command dispatch buffer, the received command may be stored in an available command slot (e.g., for a memory partition associated with the received memory command), the tail pointer 331 may be updated to point to the slot where the new memory command is stored and the next pointer for the command slot 314 may also be updated to point to the command slot where the new command is stored. Alternatively, if the command in command slot 311 (the first command) is dispatched (e.g., in response to availability in a command queue associated with Chip 0), the command dispatch buffer 300 may simply update the head pointer 321 to point to the memory command in command slot 312. The next pointers and tail pointer 331 for the Chip 0 linked list would not need to be updated in this situation.

The linked lists for Chip 1 and Chip 2 in FIG. 3 may be utilized in similar fashion. The linked list for Chip 1 includes only two commands, a first command in slot 315 and a second command in slot 316. For the linked list for Chip 1, a head pointer 322 points to the first command in slot 315, the next pointer of the slot 315 points to the second command in slot 316, and the tail pointer 332 also points to the second (and last command) of the linked list for Chip 1 in slot 316.

As shown in FIG. 3, the linked list for Chip 2 includes only a single command, which is stored in slot 317. In this situation, the head pointer 323 for the linked list for Chip 2 and the tail pointer 333 both point to the single command in slot 317. As there is only a single command (e.g., no next command) in the linked list for Chip 2 (slot 317), the next pointer field of command slot 317 would be set to a null value, so as to indicate that there is no next command. The pointers for the linked lists for Chips 1 and 2 may be updated in similar fashion as was discussed above with respect to the linked list for Chip 0.

The command dispatch buffer 300 also illustrates a head pointer 324 and a tail pointer 334 for implementing a linked list for Chip 3. However, as shown in FIG. 3, there are no memory commands stored in the unified command buffer for Chip 3. Accordingly, in this situation, the head pointer 324 and the tail pointer 334 would be set to null values to indicate that the linked list is empty. When a memory command for Chip 3 is received at the command dispatcher 233, the command dispatch buffer 300 may store the received command in an available command slot (e.g., for a memory partition associated with the received memory command), and the head pointer 325 and the tail pointer 334 may be initialized to point to the slot where the new memory command is stored.

If additional commands are then received for Chip 3, the head pointer 324, the tail pointer 334 and the next pointer(s) of command slots used to implement the linked list of memory commands for Chip 3 may be updated using the techniques described herein. Also, if the command dispatch buffer 300 dispatches all the commands of a linked list for a given memory device, the command buffer 300 would, in that situation, be configured to set the head pointer and tail pointer for a corresponding linked list to null values, so as to indicate the linked list as being empty.

FIG. 4 is a table 400 illustrating command dispatch buffer command slot allocations in accordance with example implementations. The allocations illustrated in the table 400 may be used, e.g., by the command dispatch buffer 300, to allocate memory command slots in the unified command buffer 310 to memory partitions that are implemented in a computing system, such as those discussed above with respect to FIG. 2.

As indicated in FIG. 4, the example allocations are based on a unified command buffer 310 with one-thousand total command slots. The table 400 illustrates three examples of allocating the one-thousand total command slots to three memory partitions, PARTITION_A, PARTITION_B and PARTITION_C. In the first example (shown in the first row), PARTITION_A is allocated fifty percent of the available command slots, while PARTITION_B and PARTITION_C are each allocated twenty-five percent of the available command slots. Accordingly, in this example, PARTITION_A would have five-hundred command slots allocated to it, while PARTITION_B and PARTITION_C would each have two-hundred fifty command slots allocated to it. In the second example (shown in the second row) of the table 410, PARTITION_A is allocated and guaranteed six-hundred command slots, PARTITION_B is allocated and guaranteed three-hundred command slots, and PARTITION_C is allocated and guaranteed one-hundred command slots. In both the first example and second example of table 410, there are no command slots that are shared between the three memory partitions.

In certain implementations, the available command slots of the unified command buffer 310 may be oversubscribed. Such oversubscription of the unified command buffer may occur when the number of command slots allocated to memory partitions implemented in a corresponding computing system, such as the computing system 200, exceeds the number of available command slots.

The third example (shown in the third row) in the table 410 illustrates an example of oversubscription, where PARTITION_A is allocated seven-hundred command slots, while PARTITION_B and PARTITION_C are each allocated three-hundred command slots. In this example, the total number of command slots that have been allocated is one-thousand three-hundred, which is three-hundred more than the number of command slots available, thus the unified buffer would be oversubscribed. In this situation, the command dispatch buffer may provide each memory partition with a guaranteed number commands slots that is lower that its original allocation, while the a number of command slots that is equal to the amount of oversubscription are shared between the partitions (e.g., based on a work sharing algorithm).

In the third example of the table 410, PARTITION_A is guaranteed five-hundred command slots, PARTITION_B and PARTITION_C are each guaranteed one-hundred command slots, while three-hundred command slots are shared between the memory partitions. In other implementations, command slots in an oversubscription situation may be guaranteed and shared in different manners. For instance, one or more partitions may be allocated a guaranteed number of command slots, while other partitions only have access to a pool of shared command slots. In other implementations, different partitions may have access to different numbers of shared command slots. The particular approach used for allocating and/or sharing command slots will depend, at least in part, on the particular implementation.

Figure 5:
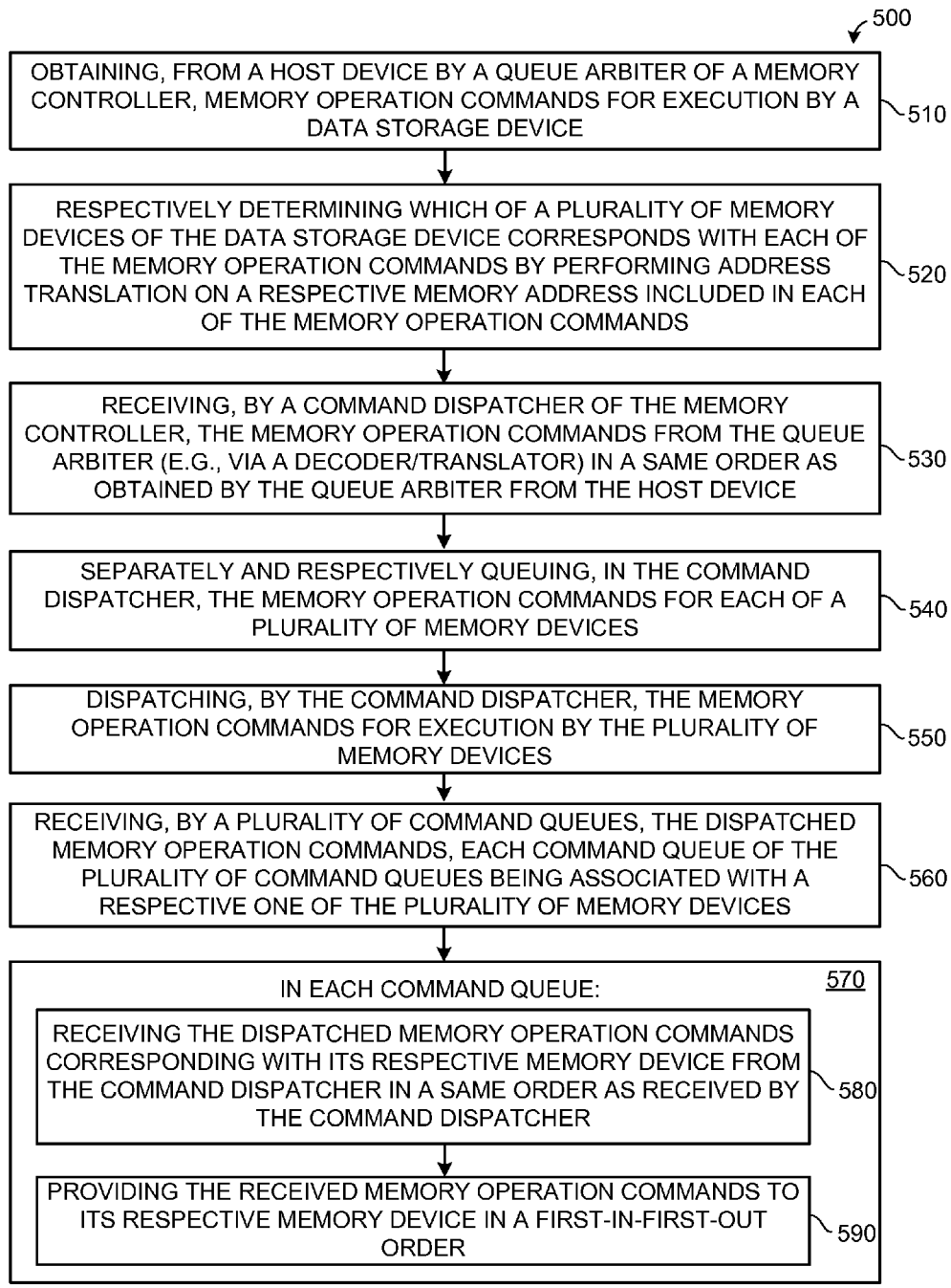
FIG. 5 is a flowchart illustrating a method for processing memory operation commands in accordance with an example implementation.

FIG. 5 is a flowchart illustrating a method 500 for processing memory operation commands in accordance with an example implementation. The method 500 may be implemented using the apparatus shown in FIGS. 1-3 and command slot allocation techniques, such as those described with respect to FIG. 4. Accordingly, for purpose of illustration, the method 500 will be described with further reference to FIGS. 1-4, as appropriate. It will be appreciated, however, that the method 500 may be implemented using other appropriate apparatus and techniques.

When implemented using the computing system 200 shown in FIG. 2, the method 500 includes, at block 510, obtaining, from the host device 210 by the queue arbiter 231 of the memory controller 230, memory operation commands for execution by a data storage device. The memory operation commands obtained from the host device 210 may include flash memory commands, such as those described herein. At block 520, the method 500 includes respectively determining (e.g., by the decoder/translator 232), which of the plurality of memory devices 250 corresponds with each of the memory operation commands. As discussed above, the decoder/translator 232 may determine which of the memory devices 250 corresponds with a given memory operation command by performing address translation (e.g., logical to physical address translation) on a respective memory (logical) address that is included in the given memory operation command. In other implementations, such address translation may be performed by the host computing device 210. In such approaches, the operation at block 520 may be eliminated.

At block 530, the method 500 includes receiving, by the command dispatcher 233 of the memory controller 230, the memory operation commands from the queue arbiter 231 in a same order as obtained by the queue arbiter 231 from the host device 210. The memory operation commands may be received at the command dispatcher 233 via the decoder/translator 233 or, in implementations where address translation is performed by the host computing device 210, directly from the queue arbiter 231. At block 540, the method 500 includes, separately and respectively queuing, in the command dispatcher 244, the memory operation commands for each of the plurality of memory devices 250. The command dispatcher 233 may perform the queuing at block 540 using the command buffer 310 and linked list approach illustrated in FIG. 3, as discussed above.

At block 550, the method 500 includes dispatching, by the command dispatcher 233, the memory operation commands for execution by the plurality of memory devices 250. In this example, the command dispatcher 233, at block 550, may dispatch the memory operation commands, respectively, to the command queues 234a-236b that correspond with each memory operation (e.g., as determined at block 520). Memory operation commands may be dispatched from the command dispatcher 233 to the command queues 234a-236b using, for example, the approaches described herein. Of course, the particular approach used to dispatch memory operation commands will depend on the particular implementation, and a number of appropriate techniques may be used.

The method 500 further includes, at block 560, receiving, by the plurality of command queues 234a-236b, the dispatched memory operation commands. As was discussed above, each command queue 234a-236b of the plurality of command queues may be associated, respectively, with one of the plurality of memory devices 250.

As illustrated in FIG. 5, the method 500 includes, at block 570, operations 580 and 590 that may be performed by each of the plurality of command queues 234a-236b. At block 580, the method 500 includes, for a given command queue 234a-236b, receiving the dispatched memory operation commands corresponding with its respective memory device 250 from the command dispatcher 233 in a same order as received by the command dispatcher. As described herein, memory operation commands may be dispatched from a command dispatcher when a corresponding command queue notifies the command dispatcher that space is available in the command queue. Using the approach described with respect to FIG. 3 to queue memory operation command, when a command is dispatched, the pointers (next, head and/or tail) for the linked list that corresponds with the respective memory device 250 as updated as appropriate, such as in the fashions described herein.

At block 590, the method 500 includes providing the received memory operation commands from the given command queue 234a-236b to its respective memory device 250 in a first-in-first-out order. In similar fashion as the approach discussed above for dispatching memory operation commands from the command dispatcher 233 to the command queues 234a-236b in response to notifications from the command queues 234a-236b, the command queues 234a-236b may provide memory operation commands to their respective memory devices 250 when notified by that their respective memory devices 250 that they are ready to receive a memory command for execution.

Figure 6:
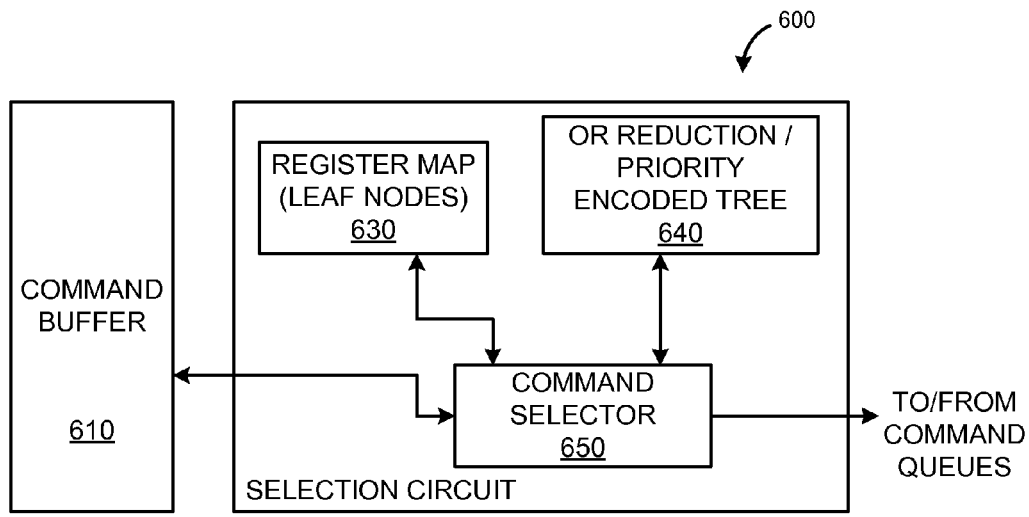
FIG. 6 is a block diagram illustrating a command dispatcher in accordance with an example implementation.

FIG. 6 is a block diagram illustrating a command dispatcher 600 in accordance with an example implementation. In one implementation, the command dispatcher 600 may be implemented as the command dispatcher 233 in the memory controller 230 illustrated in FIG. 2. Further, the memory controller 600 may be implemented using the command dispatch buffer 300 illustrated in FIG. 3. Accordingly, for purposes of illustration, the memory controller 600 will be described with further reference to FIGS. 2 and 3, as appropriate. It will be appreciated, however, that the command buffer 600 may be implemented in memory controllers having other configurations and using command dispatch buffers having other appropriate arrangements.

As shown in FIG. 6, the command dispatcher 600 includes a command buffer 610. As indicated above, the command buffer 610 may be implemented using the command dispatch buffer 300 shown in FIG. 3. The command dispatcher 600 also includes a selection circuit 620. The selection circuit 620 may be configured to dispatch memory operation commands from the command buffer 610 to a set of command queues, such as the command queues 234-236 shown in FIG. 2, in accordance with the approaches described herein.

In the command dispatcher 600 of FIG. 6, the selection circuit 620 includes a register map 630. The register map 630 may be configured to operate as a plurality of leaf nodes for an OR-reduction and priority encoded tree 640, where each of the leaf nodes of the register map 630 corresponds with a respective one of the linked lists of the command buffer 610 and a respective memory device, e.g., of the memory devices 250a-250f, that is associated with the corresponding linked list, in like fashion as was discussed above.

In such an approach, each leaf node of the register map 630 may be configured to indicate whether an associated memory device (based on its corresponding linked list) has memory operation commands in the command buffer 610 that are waiting to be dispatched. For example, if a given memory device of the memory device 250a-250f has one or more memory operation commands awaiting dispatch in the command buffer 610, a linked list corresponding with the given memory device will have a non-null head pointer. In this situation, the leaf node corresponding with the given memory device and the corresponding linked list may be set (e.g., logic "1"). If, however, the given memory device does not have any memory operation commands awaiting dispatch in the command buffer 610, the linked list corresponding with the given memory device will have a null head pointer. In this situation, the leaf node corresponding with the given memory device and the corresponding linked list may be cleared (e.g., logic "0").

In some implementations, leaf nodes in the command dispatcher 600 may be set when their corresponding linked list has a non-null head pointer and there is available command space in an associated command queue for a respective memory device that corresponds with a given leaf node. In such an approach, a given leaf node being set indicates both that there are memory operation commands awaiting dispatch for a corresponding memory device and that there is available command space in a respective command queue for the memory device corresponding with the given leaf node. Each command queue may provide a signal to the selection circuit to indicate whether or not it has available queue space to receive new memory commands.

As is described in further detail below, the OR-reduction and priority encoded tree 640 may include a plurality of stages, where the plurality of stages are collectively configured to reduce the indications of waiting memory commands and/or available command queue space from the plurality of leaf nodes to a root node indication. In such an approach, the resulting root node indication may indicate whether the command buffer 610 has any memory operation commands for any of a plurality of corresponding memory devices awaiting dispatch, and may also indicate that there is corresponding command queue space available for each of those memory commands. For instance, when implemented in the memory controller 230 of FIG. 2, the root node indication of the OR-reduction and priority encoded tree 640 would indicate whether there are any memory commands in the command buffer 610 that are awaiting dispatch for any of the memory devices 250*a*-250*f* and may also indicate respective available command queue space for each of those memory commands.

As is also described in further detail below, in implementations where the OR-reduction and priority encoded tree 640 includes a plurality of stages, each stage may include one or more sets of branches, where each branch is configured to provide an indication of whether any of the leaf nodes (e.g., in the register map 630) that feed into that branch are set, indicating memory operation commands awaiting dispatch and, in some implementations, available command queue space. In such an approach, each set of branches may be OR-reduced to a respective single indication node in the OR-reduction and priority encoded tree 640. Each of these indication nodes, with the exception of the root indication node, may be referred to as intermediate indication nodes. Also in the OR-reduction and priority encoded tree 640, the individual branch indications for each set of branches may be encoded (e.g., using a priority encoder) to produce a respective encoded value for each indication node, including the intermediate indication nodes and the root indication node. These encoded values may be used, e.g., by the command selector 650, to efficiently iterate (traverse) the OR-reduction and priority encoded tree to identify memory operation commands for dispatch using the techniques described herein.

The command selector 650 may be configured to iterate through, or traverse the OR-reduction and priority encoded tree 640 based on its root node indication, its intermediate node indications and its priority encoded values. For instance, if the root node indicates that there are not any memory commands in the command buffer 610 awaiting dispatch or there are not any memory commands awaiting dispatch with corresponding available command queue space (e.g., the root node is cleared), the command selector 650 may not iterate the OR-reduction and priority encoded tree 640 further until the root node indicates that are memory commands awaiting dispatch or that there are memory commands awaiting dispatch with corresponding available command queue space. However, if, or when the root node indicates that there are commands awaiting dispatch (e.g., with available command queue space) in the command buffer 610, the command selector 650 may iterate or traverse the OR-reduction and priority encoded tree 640 by examining a set of intermediate nodes that feed directly into the root node indication (e.g., are OR-reduced to produce the root node indications).

In cases where an intermediate indication node is cleared, the command selector 650 may ignore that branch of the OR-reduction and priority encoded tree 640, as well as all sub-branches that feed into that intermediate root node indication. In this situation, the command selector 650 may ignore that branch and its sub-branches, as the cleared intermediate indication node indicates that all leaf nodes that feed into that intermediate indication node are also cleared, indicating that there are not any memory operation commands awaiting dispatch for the memory devices that correspond with those leaf nodes or that there are not any memory operation commands awaiting dispatch with corresponding available command queue space. In comparison, in cases where an intermediate indication node is identified as being set, the command selector 650 may continue to iterate or traverse that branch of the OR-reduction and priority encoded tree 640 (and any sub-branches) until it identifies the leaf node or leaf nodes that are set and feed into the identified intermediate indication node that was identified as being set.

Using the techniques described herein, the command selector 650 may iterate or traverse the indication nodes (e.g., intermediate and root nodes) of the OR-reduction and priority encoded tree 640 based on respective priority encoded values corresponding with each indication node. As described further below, the command selector 650 may use these priority encoded values to determine which branches of the OR-reduction and priority encoded tree 640 tree to follow from a set indication node and which branches to ignore.

In implementations where a leaf node being set does not indicate available command queue space for associated memory commands awaiting dispatch, once the command selector 650 has traversed the OR-reduction and priority encoded tree 640 and identified a set leaf node in the register map 630, the command selector 650 may be configured to then determine if a command queue for the memory device that corresponds with the set leaf node has available queue space to receive a memory operation command or commands, e.g., based on signaling from the command queue. If space is available in the corresponding command queue, the command selector 650 may obtain a memory operation command or commands from the corresponding linked list and dispatch that command or commands to the corresponding command queue, with the linked list pointers being modified as appropriate. Once the command selector 650 has dispatched all the commands from the corresponding linked list, or receives an indication from the corresponding command queue that it is not able to accept any more commands, the command selector 650 may continue iteration of the OR-reduction and priority encoded tree 640 to identify other memory commands awaiting dispatch. Using the techniques discussed herein, the command dispatcher 600 may dispatch respective commands to each of the command queues in the same order as they are received by the command buffer 610.

Figure 7A:
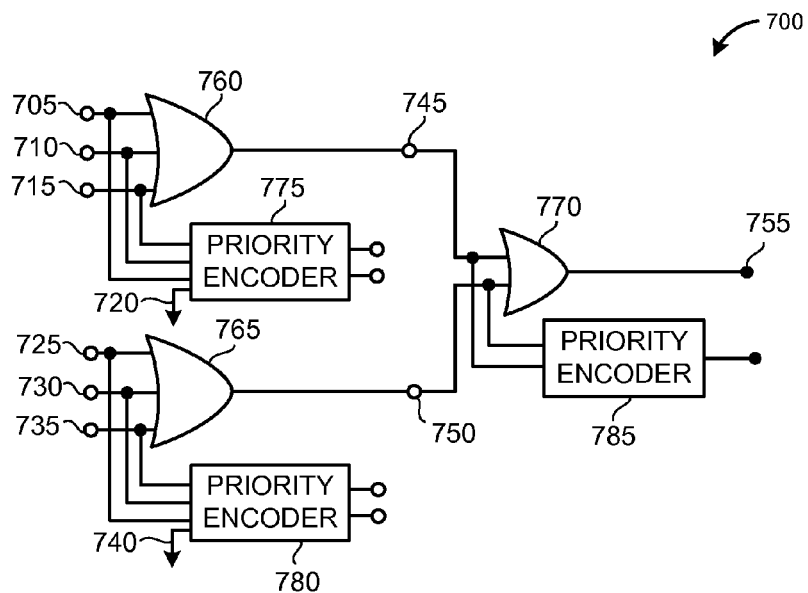
FIG. 7A is a block diagram illustrating a portion of an OR-reduction and priority encoded tree in accordance with an example implementation.
Figure 7B:
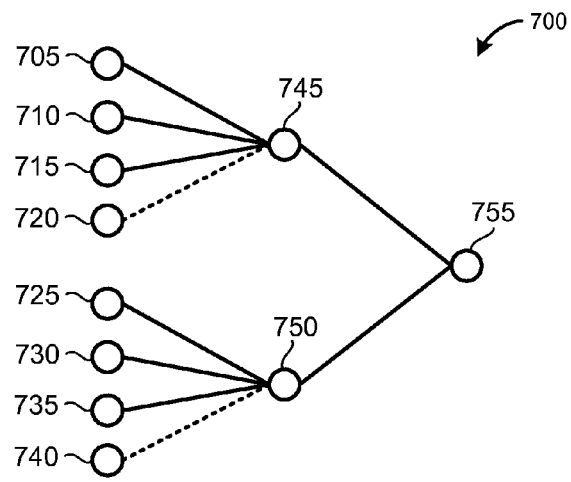
FIG. 7B is schematic diagram illustrating the portion of the OR-reduction and priority encoded tree illustrated in FIG. 7A.

FIG. 7A is a block diagram illustrating a tree portion 700 of an OR-reduction and priority encoded tree in accordance with an example implementation. The structure of the tree portion 700 may be used, for example, to implement the OR-reduction and priority encoded tree 640 of the command dispatcher 600 illustrated in FIG. 6. FIG. 7B is a schematic diagram illustrating the tree portion 700 in a simplified form. For purposes of clarity, the format used to illustrate the tree portion 700 in FIG. 7B is also used to illustrate example implementations of OR-reduction and priority encoded trees in FIGS. 9B, 9C and 9D, which are discussed below.

The following treatment of FIGS. 7A and 7B first discusses the structure of the tree portion 700 with respect to FIG. 7A and then relates the structure of the tree portion 700 as illustrated in FIG. 7B with the structure shown in FIG. 7A. The tree portion 700 illustrated in FIGS. 7A and 7B is given by way of example and for purposes of illustration. It will be appreciated, however, that the arrangement of such a tree in a given command dispatcher, such as the command dispatcher 600, will depend on the particular implementation. For instance, in certain implementations, a command dispatcher may include an OR-reduction tree that does not include priority encoding, e.g., in place of the OR-reduction and priority encoded tree 640 in FIG. 6. In such an approach, the command selector 650 may iterate the OR-reduction tree in a similar fashion as discussed above with respect to FIG. 6, but may examine (iterate) each intermediate indication node (or leaf node) that feeds into an indication node (intermediate or root) that is set to determine which branches to traverse and/or which memory devices have memory commands awaiting dispatch (e.g., with corresponding available command queue space). In this example, additional iterations may be performed due to the fact that the command selector 650 would not have the benefit of priority encoded values with which to determine which branches may be ignored. In other implementations, each section of the tree portion 700 may include additional branches and/or indication nodes.

The tree portion 700 shown in FIGS. 7A and 7B includes a plurality of indication nodes 705, 710, 715, 720, 725, 730, 735 and 740. In this example, the indication nodes 705-715 and 725-735 may implement leaf nodes, such as the leaf nodes of the command dispatcher 600 discussed above. The indication nodes 720 and 740, in this example, operate as placeholder nodes, which may be used to represent (fill) gaps in binary indices (memory channel indices and memory device (chip) indices for each memory channel) in order to facilitate implicit mapping between sequential (flat) integer chip indices for each of the memory devices of a given data storage device and the combination of respective binary memory channel indices and respective binary chip indices (within each memory channel) for each of the memory devices included in a given data storage device. Example implementations illustrating the use of such placeholder nodes are illustrated in FIG. 9 and discussed further below.

Briefly, however, and for purposes of the discussion of FIGS. 7A and 7B, the placeholder nodes 720 and 740 may represent memory devices that do not actually exist in an associated data storage device, and are used in order to structure the OR reduction and priority encoded tree to facilitate desired mapping of indices. For instance, if a given data storage device includes five memory channels and each memory channel includes five memory devices, for a total of twenty-five memory devices, the memory devices may be indexed with flat integer chip indices of 0-24. In this example, the five memory channels may be indexed using a three-bit memory channel index with binary values of 0-4 (i.e., 000b-100b) and the five memory devices on each channel may also be indexed (within the memory channel) using a three-bit chip index with binary values of 0-4. Concatenating the 3-bit channel index with the 3-bit chip index produces a 6-bit index, which has sixty-four possible values. However, in this example, there are only twenty-five memory devices that are being indexed with the 6-bit index (e.g., the concatenation of the 3-bit channel and 3-bit chip indices), leaving thirty-nine unused values for the concatenated six-bit index. When constructing an OR-reduction and priority encoded tree for a corresponding command dispatcher that will implicitly map the flat integer indices (0-24) to their corresponding 6-bit indices, the thirty-nine unused values may be represented by placeholder nodes for values of the six-bit concatenated index values that are not associated with one of the twenty five memory devices included in the data storage device. As discussed in further detail below, such an approach may allow for implicit mapping from the flat integer chip indices to the combined memory channel and chip indices.

When implemented in an OR-reduction tree, because such placeholder nodes are used to fill index gaps and do not represent actual memory devices, they may be eliminated in a corresponding OR-reduction and priority encoded tree circuit, or may simply be tied to ground (logic "0"). As the placeholder nodes, in this example, represent leaf nodes that do not correspond with a memory device, they would not be set in the corresponding OR-reduction and priority encoded tree circuit, as there could not be commands awaiting dispatch and/or available command queue space associated with the placeholder nodes. Therefore, eliminating them (for purposes of OR-reduction) or tying them to ground (for purposes of priority encoding) would be logically equivalent to implementing them as leaf nodes that would, in operation, remain cleared (logic "0"). It will be appreciated that, while the implementations described herein are described as tying placeholder nodes to ground for purpose of priority encoding, in some implementations, placeholder nodes may also be eliminated for purposes of priority encoding.

As shown in FIG. 7A, in operation, the logic values present at the indication (leaf) nodes 705, 710 and 715 of the tree portion 700 may be OR-reduced by an OR gate 760, with a result of that OR-reduction being provided at an intermediate indication node 745. Further, the logic values present at the indication nodes 705, 710 and 715 are priority encoded, using a 4-to-2 priority encoder 775, along with the placeholder node 720, which is tied to ground. The priority encoder 775 may provide its 2-bit output value to a command selector, such as the command selector 650 of FIG. 6.

In such an approach, the placeholder node 720 (ground) may be coupled with a most-significant input bit of the priority encoder 775. In this situation, the priority encoder 775 would be limited to generating binary output values of "00", "01" and "10", where the output value may represent the least significant input bit that is set, regardless of the state of the other input bits. The command selector 650 may then use the output of the priority encoder 775 to determine which of the indication nodes 705, 710 and 715 to iterate to first when the intermediate indication node 745 is set. The intermediate indication node 745, in one implementation, may be the output of the OR gate 760. In other implementations, the intermediate node 745 may be implemented using a flip-flop, a register bit or other appropriate circuit for capturing the output value of the OR gate 760.

In the tree portion 700 as shown in FIG. 7A, when in operation, logic values provided at the indication nodes 725, 730 and 735 and the placeholder node 740 may be OR reduced and/or priority encoded using, respectively, an OR gate 765 and a priority encoder 780 in like fashion as discussed above for the indication nodes 705, 710 and 715 and the placeholder node 720. The logic value provided at the intermediate indication node 750 (by the OR gate 765) and the output of the priority encoder 780 may also be used by a command selector, such as the command selector 650, to determine which of the indication nodes 725, 730 and 735 to iterate to first when the intermediate indication node 750 is set. Furthermore, the intermediate indication node 750, in like fashion as the intermediate indication node 745, may be implemented by the output of the OR gate 765, using a flip-flop, a register bit or a latch, or by a number of other approaches.

Also in the tree portion 700 shown in FIG. 7A, when in operation, the logic values provided at the intermediate indication nodes 745 and 750 may be OR-reduced by the OR-gate 770, with the result of the OR-reduction being provided at indication node 755, which may, in this example, operate as a root indication node of the tree portion 700. The logic values provided at intermediate indication nodes 745 and 750 may also be priority encoded by a two-to-one priority encoder 785. The logic value that is provided at the indication node 755 (e.g., by the OR gate 770) and the output of the priority encoder 785 may then be used by a command selector, such as the command selector 650, to determine which of the intermediate indication nodes 745 and 750 to iterate to first when the indication node 755 is set, such as using the techniques described herein. Furthermore, the indication node 755, in like fashion as the intermediate indication nodes 745 and 750, may be implemented by the output of the OR gate 700, using a flip-flop, a register bit or a latch, or by a number of other approaches.

Referring now to FIG. 7B, the tree portion 700 shown in FIG. 7B is the tree portion 700 of FIG. 7A illustrated in simplified, schematic form. In the representation of the tree portion 700 shown in FIG. 7B, indication nodes that contribute to an OR-reduced logic value of a subsequent node are represented by solid lines. In comparison, placeholder nodes, which may be eliminated for purposes of OR-reduction and tied to ground (or eliminated) for purposes of priority encoding, are represented by dashed lines.

Using the foregoing description of the structure of the tree portion 700 illustrated in FIG. 7B, the diagram in FIG. 7B may be interpreted as follows. For the tree portion 700, when in operation, logic values present at the indication nodes 705, 710 and 715 are OR-reduced to produce an OR-reduced logic value at intermediate indication node 745, while logic values present at the indication nodes 705, 710 and 715 and a ground signal (corresponding with placeholder node 720) are priority encoded to produce a priority encoded value corresponding with the intermediate indication node 745. Likewise, when in operation, logic values present at the indication nodes 725, 730 and 735 are OR-reduced to produce an OR-reduced indication value at intermediate indication node 750, while logic values present at the indication nodes 725, 730 and 735 and a ground signal (corresponding with placeholder node 740) are priority encoded to produce a priority encoded value corresponding with the intermediate indication node 750. In similar fashion, when in operation, logic values present at the intermediate indication nodes 745 and 750 are OR-reduced to produce an OR-reduced indication value at indication node 755 (which may function as a root indication node), while logic values present at the intermediate indication nodes 745 and 750 are priority encoded to produce a priority encoded value corresponding with the intermediate indication node 750.

Figure 8:
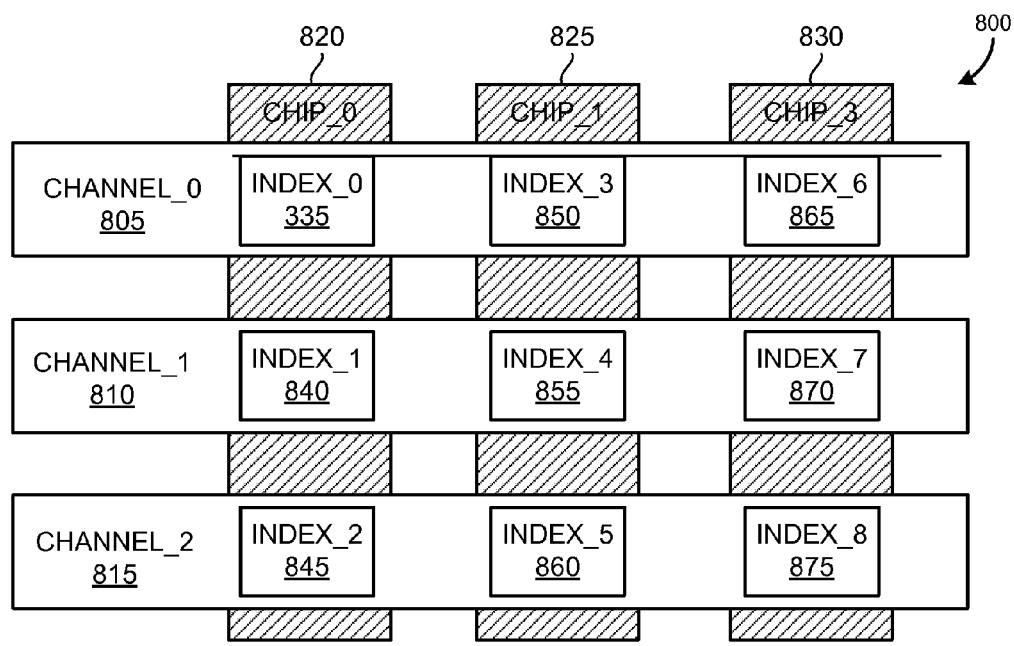
FIG. 8 is a block diagram illustrating an approach for flat chip indexing, memory channel indexing and chip indexing in accordance with an example implementation.

FIG. 8 is a block diagram of a memory channel arrangement 800 that may be included in a data storage device 800 in accordance with an example implementation. FIG. 8 illustrates an example approach for flat chip indexing, memory channel indexing and chip indexing, within each memory channel. The various indices shown for the memory channel arrangement 800 are also used in the example implementations of FIGS. 9A-9D, which are discussed below. It will be appreciated, however, that other approaches to indexing a data storage device are possible. For instance, the flat chip indices used in the example implementation of FIG. 8 could be arranged in a different fashion. In other implementations, the flat chip indices could be eliminated, and the memory devices could be referenced with their combined channel and chip index after translation from a virtual memory address. Of course, other arrangements are also possible.

The memory channel arrangement 800 shown in FIG. 8 may implemented in a data storage device of a computing system, such as in the data storage device 120 of the computing system 100 shown in FIG. 1, or as the memory channels 240 and the memory devices 250 in the computing system 200 shown in FIG. 2. Of course, the memory channel arrangement 800 shown in FIG. 8 may be used in a number of other data storage device configurations and/or computing system configurations.

As illustrated in FIG. 8, the memory channel arrangement 800 includes three memory channels, Channel_0 805, Channel_1 810 and Channel_2 815. The memory channels 805, 810 and 815 may be indexed, by a corresponding memory controller, using respective binary "channel indices" of "00b", "01b" and "10b." In this arrangement, a two-bit channel index is used so that each memory channel may be assigned a unique, binary memory channel index. However, there are four possible values for a two-bit index, while the memory channel arrangement 800 has three memory channels. Accordingly, in this example, there would be one unused value (e.g., gap) for a two-bit memory channel index used in the memory channel arrangement 800.

As further illustrated in the example of FIG. 8, the memory channel arrangement 800 includes three memory devices (chips) per memory channel, which respectively correspond with the columns Chip_0 820, Chip_1 825 and Chip_2 830. The columns 820, 825 and 830 are shown in FIG. 9 for purposes of illustrating the memory device (chip) indexing for each memory channel and are not intended to represent an operable connection between memory devices of different memory channels that have the same chip index.

The memory chips for each of the memory channels 805-815 may be indexed, by a corresponding memory controller, using respective binary "chip indices" of "00b", "01b" and "10b" in correspondence with the columns 820, 825 and 830. In this arrangement, a two-bit memory chip index is used to index the memory devices in each channel, which allows for each memory device to have a unique memory chip index within its respective memory channel. However, as with the channel index discussed above, there are four possible values for a two-bit index. Accordingly, in this example, there would be one unused value (e.g., gap) for a two-bit chip index for each of the memory channels 805, 810 and 815. Additionally, there would be unused values for each of the four possible chip indices when combined with the channel index of "11b", as there is not a memory channel present with that index and therefore, no memory devices associated with those channel and chip indices.

As is also shown in the memory channel arrangement 800 of FIG. 8, the nine memory chips 835, 840, 845, 850, 855, 860, 865, 870 and 875 (three per memory channel) may be referenced with a flat integer chip index (hereafter "flat chip index" or "flat index") with respective decimal values of 0-8. In FIG. 8, the respective flat indices are shown as respective suffixes for each of the text labels of the memory device 835-875.

In this example, concatenating the two-bit channel index with the two-bit chip index produces a four-bit value, with sixteen possible values. However, the memory channel arrangement 800 only includes nine memory devices. Therefore, in this example, there would be seven unused values (gaps) for the four-bit index value that results from the concatenation of the channel index and the chip index of the memory channel arrangement 800.

Referring again to FIG. 2, an example of the use of the flat indices, channel indices and chip indices will be described. As was discussed above, the queue arbiter 231 of the memory controller 200 may obtain memory operation commands for execution from the host computing device 210 and provide those memory operation commands to the decoder/translator 232, which may be configured to determine which of a plurality of memory devices (e.g., the memory devices 835-875) corresponds with each of the obtained memory operation commands. For instance, the decoder/translator 232 may be configured to the determine the flat index of a corresponding memory chip based on a respective memory address included in each of the memory operation commands that are obtained from the host computing device 210.

In such an approach, after determining the flat chip index of a memory chip that is associated with a given memory device, the memory controller 230 may map that flat index to a corresponding channel index and corresponding chip index. For instance, if a memory operation command is obtained that is determined to correspond with the memory device index_4 855 (flat index 4), the memory controller 200 would map the flat index 4 to channel index "01b" and chip index "01b", for a concatenated four bit index of "0101b." The memory controller 200 may use a number of different approaches for accomplishing such flat index to channel and chip index mapping. For instance, the memory controller 230 may include a look-up-table that maps the flat indices to the channel and chip indices. Such approaches, however, may utilize RAM on the memory controller 200. Such an approach (as well as similar approaches) may be undesirable, as RAM resources may be limited in the memory controller 200 and would be preferably used for other purposes.

As was indicated above, flat chip indices, such as those shown in FIG. 8, may be implicitly mapped to corresponding chip and channel indices using a properly arranged OR reduction tree, such as the OR reduction and priority encoded tree 640 of the command dispatcher 600. Such implicit mapping may be achieved by arranging a corresponding OR reduction tree to take into account any gaps in the channel and chip indices, such as described herein, when mapping the flat indices to the chip and channel indices. An example approach that facilitates such mapping is illustrated in table form in FIG. 9A and as associated example OR-reduction and priority encoded trees in FIGS. 9B-9D, which are all described below.

Figure 9A:
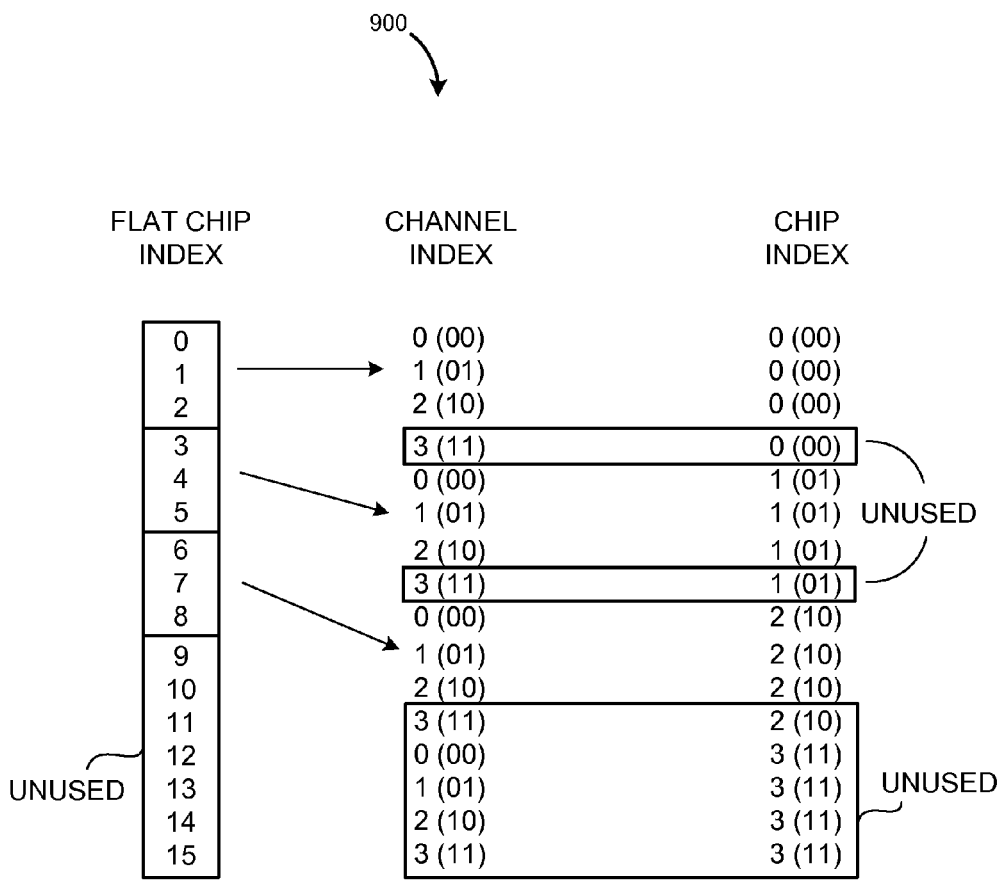
FIG. 9A is a table illustrating the flat chip indexing, memory channel indexing and chip indexing of FIG. 8 in accordance with an example implementation.

FIG. 9A is a table 900 illustrating the mapping of flat chip indexing to corresponding channel and chip indexing in accordance with an example implementation. In FIG. 9A, the table 900 illustrates an approach for mapping the flat chip indices of the memory channel arrangement 800 of FIG. 8 to the 4-bit channel and chip indices of the memory channel arrangement 800. The particular arrangement of the table 900 is given by way of example and for purposes of illustration. In other implementations, the table 900 may be arranged in different fashions. For example, flat chip indices and the channel and chip indices could be ordered differently in the table 900.

In the table 900, the left column sequentially lists flat chip indices 0-15, which correspond with the sixteen possible values associated with the four-bit (concatenated) channel and chip index of the memory channel arrangement 800. As previously discussed, only nine flat chip indices are used in the memory channel arrangement 800 (flat indices 0-8). This leaves seven unused values of the flat chip indices (indices 9-15), which are indicated as unused in the leftmost column of FIG. 9A.

The center column of the table 900 sequentially lists the four possible values for the 2-bit channel index four times in succession, so that the center column includes sixteen rows (e.g., with each of the four possible 2-bit values listed four times). The right column of the table 900 lists each of the four possible values for the 2-bit chip index of the memory channel arrangement 800 in groups of four (i.e., zero for four rows, one for four rows, two for four rows and three for four rows). The channel indices and the chip indices listed in the table 900 are shown as integer values with their corresponding binary values shown in parentheses. This arrangement result in all sixteen possible values for the 4-bit chip and channel index of the memory channel arrangement being represented by the concatenation of the values in the channel index column and the chip index column.

As shown in FIG. 9A, seven 4-bit chip and channel indices are indicated as being unused. As may be seen in the table 900, these unused indices correspond with indices where the binary value of one or both of the channel index and the chip index is "11", or integer value 3. Those indices are not used in this example because they do not correspond with a memory device in the memory channel arrangement 800. As was indicated above, and is further illustrated below in FIGS. 9B-9D, these unused indices may be represented in a corresponding OR-reduction and priority encoded tree as placeholder nodes, which facilitates implicit mapping of flat chip indices to corresponding channel and chip indices in such trees.

As is also shown in the table 900 in FIG. 9A, the flat chip indices 0-8 map to their corresponding 4-bit chip and channel indices for the memory channel arrangement 800, which also facilitates the implicit mapping of the flat indices to the chip and channel indices in a corresponding OR-reduction and priority encoded tree. For instance, flat chip index "0" maps to channel index "0" and chip index "0", which directly corresponds with the arrangement shown in FIG. 8. As an additional example, flat chip index "5" maps to channel index "2" and chip index "1", which also directly corresponds with the arrangement of the memory channel configuration 800. The remaining flat chip indices in the table 900 that correspond with memory devices of the memory channel arrangement 800 (i.e., flat chip indices 1-4 and 6-8) similarly map to their corresponding channel and chip indices as illustrated in FIG. 8.

Figure 9B:
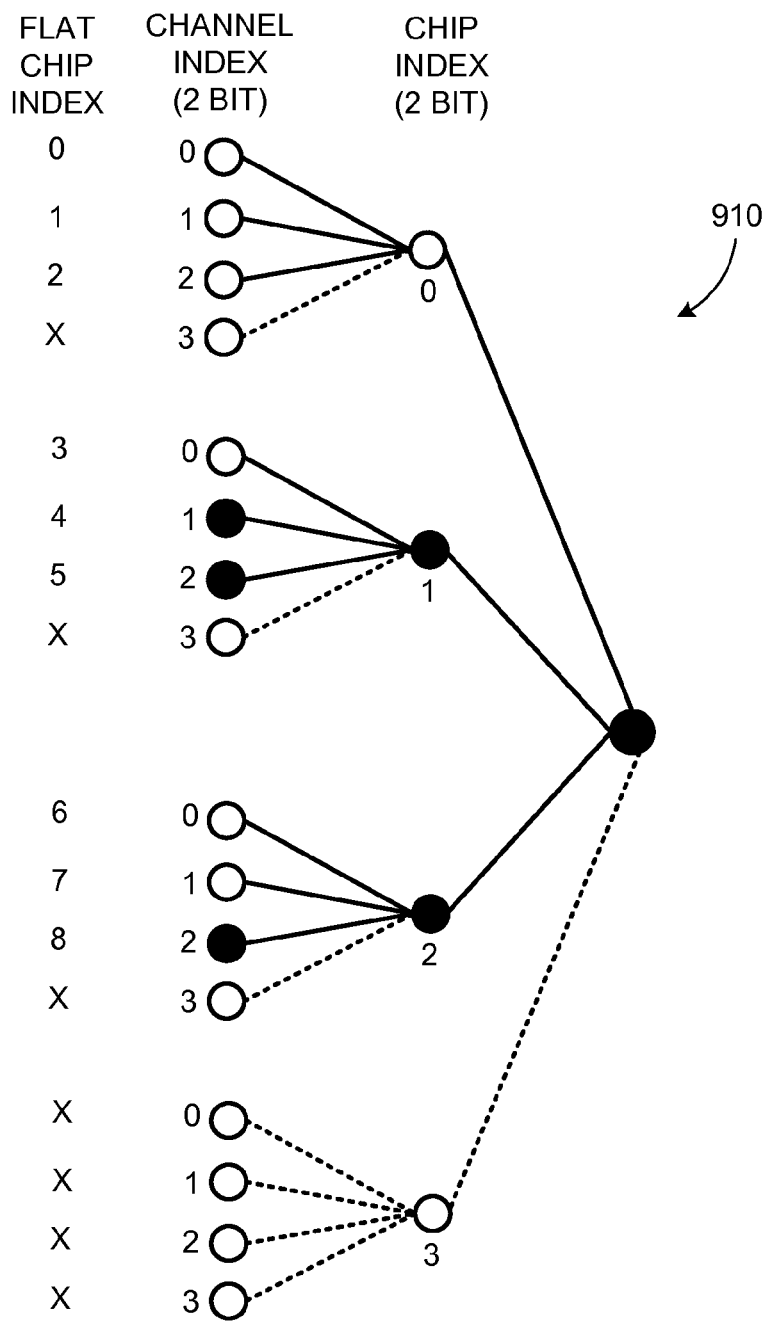
FIGS. 9B, 9C and 9D are schematic diagrams illustrating OR-reduction priority encoded trees in accordance with example implementation.
Figure 9C:
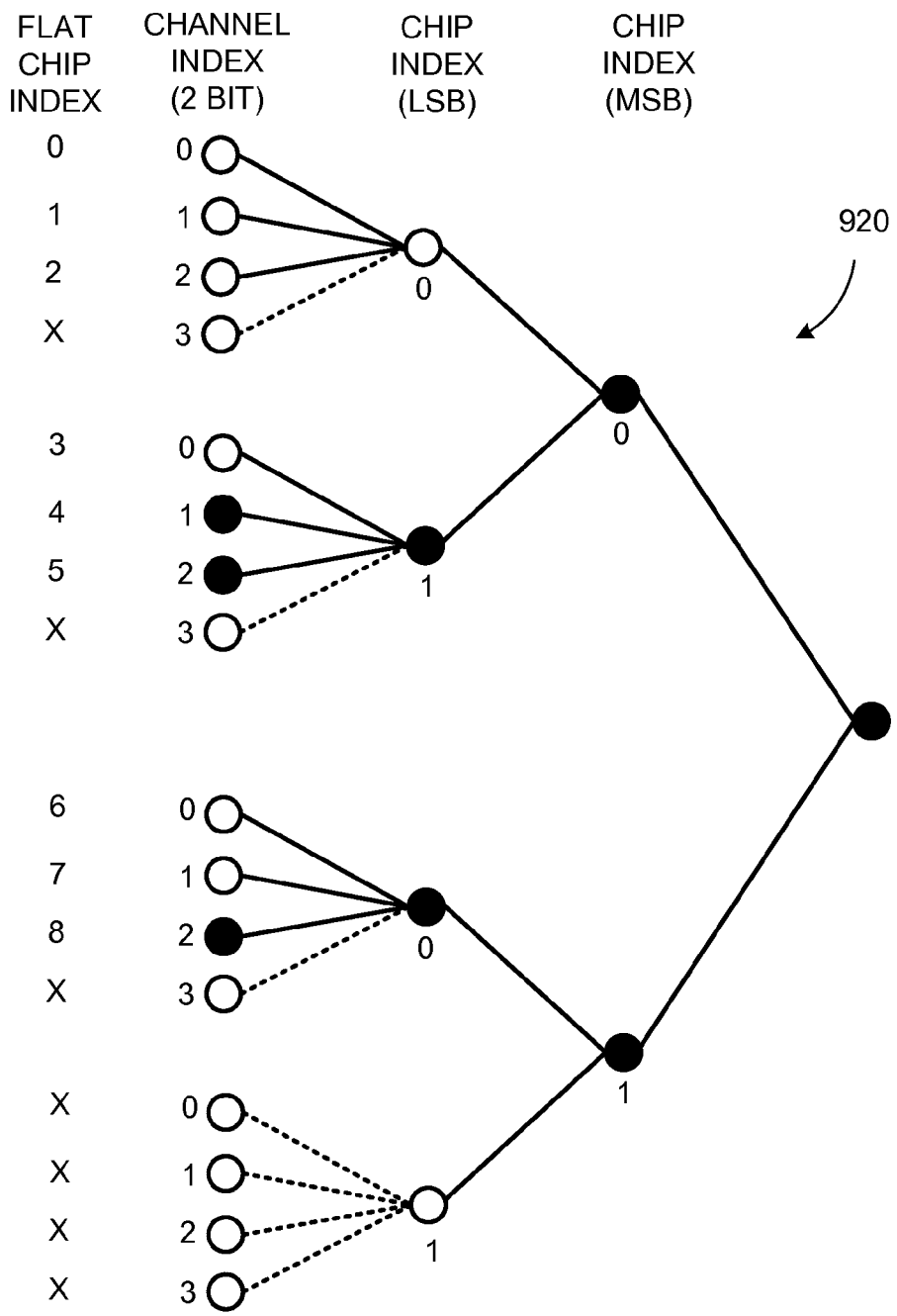
Figure 9D:
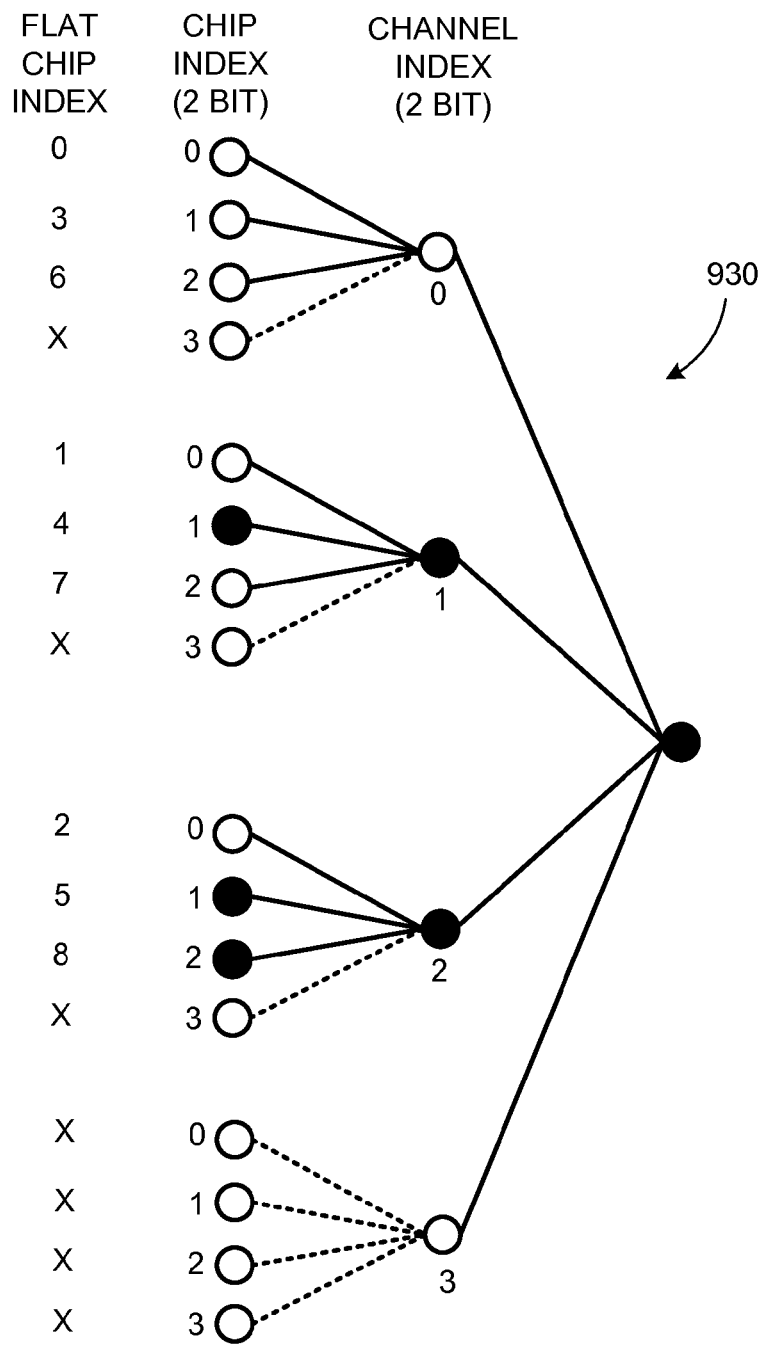

FIGS. 9B, 9C and 9D are schematic diagrams illustrating, respectively, OR-reduction and priority encoded trees 910, 920 and 930 in accordance with example implementations. The OR-reduction and priority encoded trees 910, 920 and 930, which correspond with the index mappings shown in the table 900 of FIG. 9A, are illustrated using like structure as the tree portion 700 illustrated in FIG. 7B and described above.

For instance, indication values (e.g., indicating whether or not memory commands are awaiting dispatch and/or whether corresponding command queue space is available for those commands) provided at the leaf nodes that correspond with the memory chip flat indices of 0, 1 and 2 in a circuit implementing the tree 910 may be OR-reduced to produce an indication value for the intermediate indication node that corresponds with 2-bit chip index "0" in the tree 910. Further, the indication values provided at the leaf nodes corresponding with the memory chip flat indices of 0, 1 and 2 in the tree 910, in a corresponding circuit, may be priority encoded (e.g., along with a ground signal representing the placeholder node (indicated by a dashed line) that is grouped with those leaf nodes) to produce a priority encoded value associated with the intermediate indication node that corresponds with 2-bit chip index "0." The trees 910, 920 and 930 include placeholder nodes (indicated using "x") for each of the unused 4-bit chip and channel indices shown in the table 900. These placeholder nodes are placed at appropriate locations in the trees 910, 920 and 930 so as to facilitate the implicit mapping of indices, as described herein. In like fashion as discussed above, in circuits implementing the trees 910, 920 and 930, these placeholder nodes may be represented by ground signals or, in other implementations, may be eliminated, as they do not correspond with actual memory devices included in an associated data storage device.

As may be seen in each of the trees 910, 920 and 930, each branch of those trees corresponds with one of the possible values of the 2-bit chip index, the 2-bit channel index, or one of the individual bits (i.e., the least-significant bit (LSB) and the most-significant bit (MSB)) of the 2-bit chip index. It will be appreciated that, in such a tree structure, the individual bits of the channel index could be broken out in similar fashion as the bits of the chip index in the tree 920. Due to the arrangement of the trees 910, 920 and 930, traversing those trees allows for implicit mapping of the flat indices for the memory devices of the memory channel arrangement 800 to their corresponding chip and channel indices, such as previously discussed.

As an example, starting at the root indication node of the tree 910, if the branch corresponding with chip index "2" is traversed first and then the sub-branch for the channel index "1" is traversed from there, this traversal path results in arriving at the leaf node corresponding with the memory device with a flat chip index of "7." Reference to FIG. 8 demonstrates that this implicit mapping correctly maps the flat index to the correct channel and chip indices.

Implicit mapping may be similarly accomplished using the trees 920 and 930. For instance, in the tree 920, traversing the branch for a chip index MSB of "0", then the branch for a chip index LSB of "1" (i.e., for a 2-bit chip index of "1"), and then the branch for a 2-bit channel index of "0" leads to the leaf node corresponding to the memory device with a flat index of "3." Referring again to FIG. 8 demonstrates that this implicit mapping correctly maps the flat index to the correct chip and channel indices. In the tree 930 shown in FIG. 9D, the branches for the 2-bit chip indices and the 2-bit channel indices are reversed from the arrangement shown in FIG. 9B. However, the arrangement of the tree 930 illustrated in FIG. 9D still provides for implicit mapping of the flat indices for the memory devices of the memory channel arrangement 800 to their corresponding chip and channel indices (such as are illustrated in FIGS. 8 and 9A) by reordering the flat chip indices as shown in FIG. 9D. Using the arrangement shown in FIG. 9D, traversal of the tree 930 in like fashion as discussed above with respect to FIGS. 9B and 9C results in accurate mapping of the flat indices of the memory devices of the memory channel configuration 800 to their corresponding channel and chip indices.

Referring again to FIG. 9B, an example approach for iterating (traversing) the OR-reduction and priority encoded tree 910 will now be described. As illustrated in FIG. 9B, indication nodes of tree 910 that are set are filled in, while indication nodes that are cleared are open (e.g., not filled in). The tree 910 may be iterated (traversed) using a command selector, such as the command selector 650 illustrated in FIG. 6 and described above.

To begin iterating (traversing) the tree 910, the command selector may examine the tree's root indication node and determine that it is set. The set root indication node may indicate to the command selector that one or more memory devices of an associated data storage device have memory commands that are awaiting dispatch, such as in a command buffer 610, as was previously described. The set root indication node may also indicate that there is corresponding command queue space for any commands awaiting dispatch, as was also described above. The command selector would then proceed to further iterate (traverse) the tree 910 based on a priority encoded value associated with the root node indication. In the specific example of FIG. 9B, the associated priority encoded value for the root indication node of the tree 910 would be "1", which would indicate to the command selector that the branch for the 2-bit chip index of "0" in the tree 910 may be ignored. The command selector may then iterate (traverse) to the intermediate indication node corresponding with a 2-bit chip index of "1", which would also have an associated priority encoded value of "1." This would indicate that the leaf node associated with a flat chip index of "3" may be ignored.

In this situation, the command selector would iterate to the leaf node associated with the memory device having a flat index of "4." The command selector may then obtain one or more memory commands awaiting dispatch for that memory device from an associated command buffer and dispatch the memory command or commands to a respective command queue (e.g., if the command queue indicates, or has previously indicated, to the command selector that command space is available). Once pending memory commands for that memory device are dispatched, the leaf node corresponding with the memory device with flat index "4" would be cleared (e.g., in response to head pointer of a corresponding linked list being nulled) and the command selector may continue to iterate the tree 910. In certain implementations (e.g., where a set leaf node only indicates memory commands awaiting dispatch and does not indicate corresponding available command queue space), if the corresponding command queue indicates that it does not have command space during iteration, the command selector may continue iteration of the tree 910 without dispatching the memory commands for the memory device with flat index "4", and later iterate back to that leaf node to dispatch the pending memory command or commands for that memory device.

In this example, once the memory operation command or commands associated with the leaf node with flat index "4" are dispatched, the intermediate indication node corresponding with the 2-bit chip index of "1" would remain set, but the associated priority encoded values for that indication node would change to "2", indicating that one or memory commands for the memory device with flat index "5" are awaiting dispatch (e.g., with corresponding available command queue space). Once that memory command or commands are dispatched, the leaf node for the memory device with flat index "5" and the intermediate indication node for the 2-bit chip index "1" may be cleared (e.g., as long as additional commands have not arrived in a command buffer for memory devices in that branch).

The command selector may then iterate to the intermediate indication node for the 2-bit chip index of "2" in the tree 910 (e.g., based on a priority encoded value of "2" that would now be associated with the root indication node). That intermediate indication node would, in this example, have an associated priority encoded value of "2", indicating that the memory device with the flat index of "8" has one or more memory commands awaiting dispatch (e.g., with corresponding available command queue space). After the command dispatcher dispatches those command, e.g., using the techniques described herein, if no additional memory commands have arrived in an associated command buffer during the iteration of the tree 910, all the indication nodes of the tree 910 may be cleared and the command selector may stop iterating the tree 910 until its root indication node is set again, indicating that one or more memory commands have arrived and are awaiting dispatch (e.g., with corresponding available command queue space).

The trees 920 and 930 shown, respectively, in FIGS. 9C and 9D have the indication nodes set for the same flat indices as the tree 910 and may be traversed in similar fashion as the tree 910. However, for purposes of brevity and clarity, the specifics of traversing the trees 920 and 930 are not described in detail here.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. Accordingly, other implementations are within the scope of the following claims.

What is claimed is:

1. A memory controller for controlling operation of a data storage device, the memory controller comprising:
   a command dispatcher configured to dispatch memory operation commands for execution by a plurality of memory devices of the data storage device, the command dispatcher including:
      a command buffer configured to separately and respectively queue the memory operation commands by maintaining, for each of the plurality of memory devices, a respective linked list of corresponding memory operation commands; and
      a selection circuit operationally coupled with the command buffer, the selection circuit including:
         a plurality of leaf nodes, each leaf node corresponding with one of the linked lists and being configured to provide an indication whether its corresponding linked list includes one or more memory operation commands awaiting dispatch; and
         an OR-reduction tree configured to reduce the indications of the plurality of leaf nodes to a root node indication, the root node indication indicating whether the command buffer has any memory operation commands stored therein that are awaiting dispatch,
         wherein the selection circuit is configured to iterate over the nodes of the OR-reduction tree to select memory operation commands for dispatch by the command dispatcher.

2. The memory controller of claim 1, further comprising a plurality of command queues operationally coupled with the command dispatcher, each command queue being associated with a respective one of the plurality of memory devices and configured to receive dispatched memory operation commands corresponding with its respective memory device from the command dispatcher in a same order as received by the command dispatcher.

3. The memory controller of claim 2, wherein each of the leaf nodes is further configured to indicate whether its corresponding command queue has available queue space.

4. The memory controller of claim 2, wherein:
   each of the plurality of command queues is configured to provide an indication to the command dispatcher when it has space to receive a next memory operation command from the command dispatcher; and
   the command dispatcher is further configured to dispatch memory operation commands to the plurality of command queues based on the iteration of the OR-reduction tree and the respective indications from the command queues.

5. The memory controller of claim 1, wherein the OR-reduction tree is arranged in accordance with:
   a set of memory channel indices that respectively correspond with memory channels of the data storage device; and
   for each channel index, a set of chip indices that respectively correspond with memory devices included in the corresponding memory channel,
   wherein the combination of a given memory channel index and a given chip index indicates a specific memory device of the plurality of memory devices.

6. The memory controller of claim 5, wherein iterating the OR-reduction tree comprises iterating the OR-reduction tree by the chip indices then by the channel indices.

7. The memory controller of claim 5, wherein iterating the OR-reduction tree comprises iterating the OR-reduction tree by the channel indices then by the chip indices.

8. The memory controller of claim 1, wherein the OR-reduction tree is arranged to facilitate mapping respective sequential integer indices for the plurality of memory devices to a respective binary memory channel index and a respective binary chip index for each of the plurality of memory devices.

9. The memory controller of claim 1, wherein indicating that a given linked list includes one or more memory operation commands awaiting dispatch comprises indicating that the given linked list has a non-null head pointer.

10. The memory controller of claim 1, wherein iterating the OR-reduction tree comprises:
   traversing branches of the OR-reduction tree that indicate memory operation commands awaiting dispatch; and
   ignoring branches of the OR-reduction tree that do not indicate memory operation commands awaiting dispatch.

11. The memory controller of claim 1, wherein:
   the OR-reduction tree includes a plurality of stages, each stage including one or more sets of branches, each branch being configured to communicate a corresponding indication of whether any leaf nodes in that branch indicate memory operation commands awaiting dispatch;
   each set of branches is OR-reduced to a respective single node of the OR-reduction tree; and
   the selection circuit further comprises, for each set of branches in the OR-reduction tree, a priority encoder configured to generate an output value based on the corresponding indications received from its respective set of branches, the command dispatcher being further configured to dispatch memory operation commands based on the output values of the priority encoders.

12. A memory controller for controlling operation of a data storage device, the memory controller comprising:
   a command dispatcher configured to dispatch memory operation commands for execution by a plurality of memory devices of the data storage device, the command dispatcher including:
      a command buffer configured to separately and respectively queue the memory operation commands by maintaining, for each of the plurality of memory devices, a respective linked list of corresponding memory operation commands; and
      a selection circuit operationally coupled with the command buffer, the selection circuit including:
         a plurality of leaf nodes, each leaf node corresponding with one of the linked lists and being configured to provide an indication whether its corresponding linked list includes one or more memory operation commands awaiting dispatch; and
         an OR-reduction tree configured to reduce the indications of the plurality of leaf nodes to a root node indication, the root node indication indicating whether the command buffer has any memory operation commands stored therein that are awaiting dispatch,
         wherein:
            the OR-reduction tree includes a plurality of stages, each stage including one or more sets of branches, each branch being configured to communicate a corresponding indication of whether any leaf nodes in that branch indicate that corresponding memory operation commands are awaiting dispatch;
            each set of branches is OR-reduced to a respective single node of the OR-reduction tree;
            the selection circuit further comprises, for each set of branches in the OR-reduction tree, a priority encoder configured to generate an output value based on the corresponding indications received from its respective set of branches;
            the selection circuit is configured to iterate over the nodes of the OR-reduction tree to select memory operation commands for dispatch by the command dispatcher; and
            the command dispatcher is further configured to dispatch memory operation commands based on the output values of the priority encoders; and
      a plurality of command queues operationally coupled with the command dispatcher, each command queue being associated with a respective one of the plurality of memory devices and configured to receive dispatched memory operation commands corresponding with its respective memory device from the command dispatcher in a same order as received by the command dispatcher.

13. The memory controller of claim 12, wherein each of the leaf nodes is further configured to indicate whether its corresponding command queue has available queue space.

14. The memory controller of claim 12, wherein the OR-reduction tree is arranged in accordance with:
   a set of memory channel indices that respectively correspond with memory channels of the data storage device; and
   for each channel index, a set of chip indices that respectively correspond with memory devices included in the corresponding memory channel, and
   wherein the combination of a given memory channel index and a given chip index indicates a specific memory device of the plurality of memory devices.

15. The memory controller of claim 12, wherein the OR-reduction tree is arranged to facilitate mapping respective sequential integer indices for the plurality of memory devices to a respective binary memory channel index and a respective binary chip index for each of the plurality of memory devices.

16. The memory controller of claim 12, wherein:
   each of the plurality of command queues is configured to provide an indication to the command dispatcher when it has space to receive a next memory operation command from the command dispatcher; and
   the command dispatcher is further configured to dispatch memory operation commands to the plurality of command queues based on the iteration of the OR-reduction tree and the respective indications from the command queues.

17. A command dispatcher for dispatching memory operation commands for execution in a data storage device, the command dispatcher comprising:
   a command buffer configured to separately and respectively queue the memory operation commands by maintaining, for each of a plurality of memory devices, a respective linked list of corresponding memory operation commands; and
   a selection circuit operationally coupled with the command buffer, the selection circuit including:
      a plurality of leaf nodes, each leaf node corresponding with one of the linked lists and being configured to provide an indication whether its corresponding linked list includes one or more memory operation commands awaiting dispatch; and an OR-reduction tree configured to reduce the indications of the plurality of leaf nodes to a root node indication, the root node indication indicating whether the command buffer has any memory operation commands stored therein that are awaiting dispatch, wherein:
the OR-reduction tree includes a plurality of stages, each stage including one or more sets of branches, each branch being configured to communicate a corresponding indication of whether any leaf nodes in that branch indicate memory operation commands awaiting dispatch;

each set of branches is OR-reduced to a respective single node of the OR-reduction tree;

the indications of each set of branches are encoded to generate a respective output value based on the corresponding indications received from its respective set of branches;

the selection circuit is configured to iterate over the nodes of the OR-reduction tree to select memory operation commands for dispatch by the command dispatcher; and the command dispatcher is configured to dispatch memory operation commands based on the respective output values and iteration of the OR-reduction tree.

18. The command dispatcher of claim 17, wherein each of the leaf nodes is further configured to indicate whether its corresponding command queue has available queue space.

19. The command dispatcher of claim 17, wherein encoding the indications of each set of branches comprises encoding the indications of each set of branches using a priority encoder.

20. The command dispatcher of claim 17, wherein the OR-reduction tree is arranged in accordance with:
a set of memory channel indices that respectively correspond with memory channels of the data storage device; and for each channel index, a set of chip indices that respectively correspond with memory devices included in the corresponding memory channel, wherein the combination of a given memory channel index and a given chip index indicates a specific memory device of the plurality of memory devices.

21. The command dispatcher of claim 20, wherein iterating the OR-reduction tree comprises iterating the OR-reduction tree by the chip indices then by the channel indices.

22. The command dispatcher of claim 20, wherein iterating the OR-reduction tree comprises iterating the OR-reduction tree by the channel indices then by the chip indices.

23. The command dispatcher of claim 17, wherein the OR-reduction tree is arranged to facilitate mapping respective sequential integer indices for the plurality of memory devices to a respective binary memory channel index and a respective binary chip index for each of the plurality of memory devices.

* * * * *